United States Patent
Stopler et al.

(10) Patent No.: US 6,920,194 B2
(45) Date of Patent: Jul. 19, 2005

(54) METHOD AND SYSTEM FOR DETECTING, TIMING, AND CORRECTING IMPULSE NOISE

(75) Inventors: Danny Stopler, Holon (IL); Ram Zamir, Tel Aviv (IL)

(73) Assignee: Tioga Technologies, Ltd., Tel Aviv (IL)

(*) Notice: Subject to any disclaimer, the term of this patent is extended or adjusted under 35 U.S.C. 154(b) by 798 days.

(21) Appl. No.: 09/866,870

(22) Filed: May 29, 2001

(65) Prior Publication Data

US 2003/0043925 A1 Mar. 6, 2003

(51) Int. Cl.[7] ................................................. H04B 1/10
(52) U.S. Cl. ..................................... 375/349; 375/350
(58) Field of Search ................................. 375/340, 346, 375/349, 350; 455/296, 303; 348/607; 704/228

(56) References Cited

U.S. PATENT DOCUMENTS

| | | | | |
|---|---|---|---|---|
| 5,867,539 A | * | 2/1999 | Koslov | 375/346 |
| 6,122,332 A | * | 9/2000 | Ogata et al. | 375/346 |
| 6,470,047 B1 | * | 10/2002 | Kleinerman et al. | 375/232 |
| 2002/0198914 A1 | * | 12/2002 | Picciolo et al. | 708/322 |

* cited by examiner

Primary Examiner—Amanda T. Le
(74) Attorney, Agent, or Firm—Darby & Darby

(57) ABSTRACT

A system for detecting and correcting impulse noise present on an input data signal includes an impulse detector module receiving an input data signal and producing as output an correction enable signal indicating when an impulse correction is required. An impulse corrector module receives the input data signal and a correction enable signal and produces a corrected data signal, e.g., having the impulse canceled or blanked, as output. A reliability estimator and selector module receives the corrected data signal and the input data signal and selects as output the input signal which is more reliable. In one embodiment, the impulse detector includes first and second complementary impulse detectors, the outputs of which are analyzed by an enable and correction module to produce an impulse detection signal with improved accuracy. Preferably, the enable and correction module also indicates the most appropriate type of impulse correction in accordance with the detection signals from the complementary detectors. A novel system and method of detecting impulses based on Gram Schmidt techniques is also presented. In this method, one or more channels of a multi-channel data signal are kept free of data. When a whitening filter is applied, impulses on these quiet channels are emphasized. The Gram Schmidt technique exploits this fact to provide for improved impulse detection. The system can be modified to detect other types of low dimensionality noise.

38 Claims, 5 Drawing Sheets

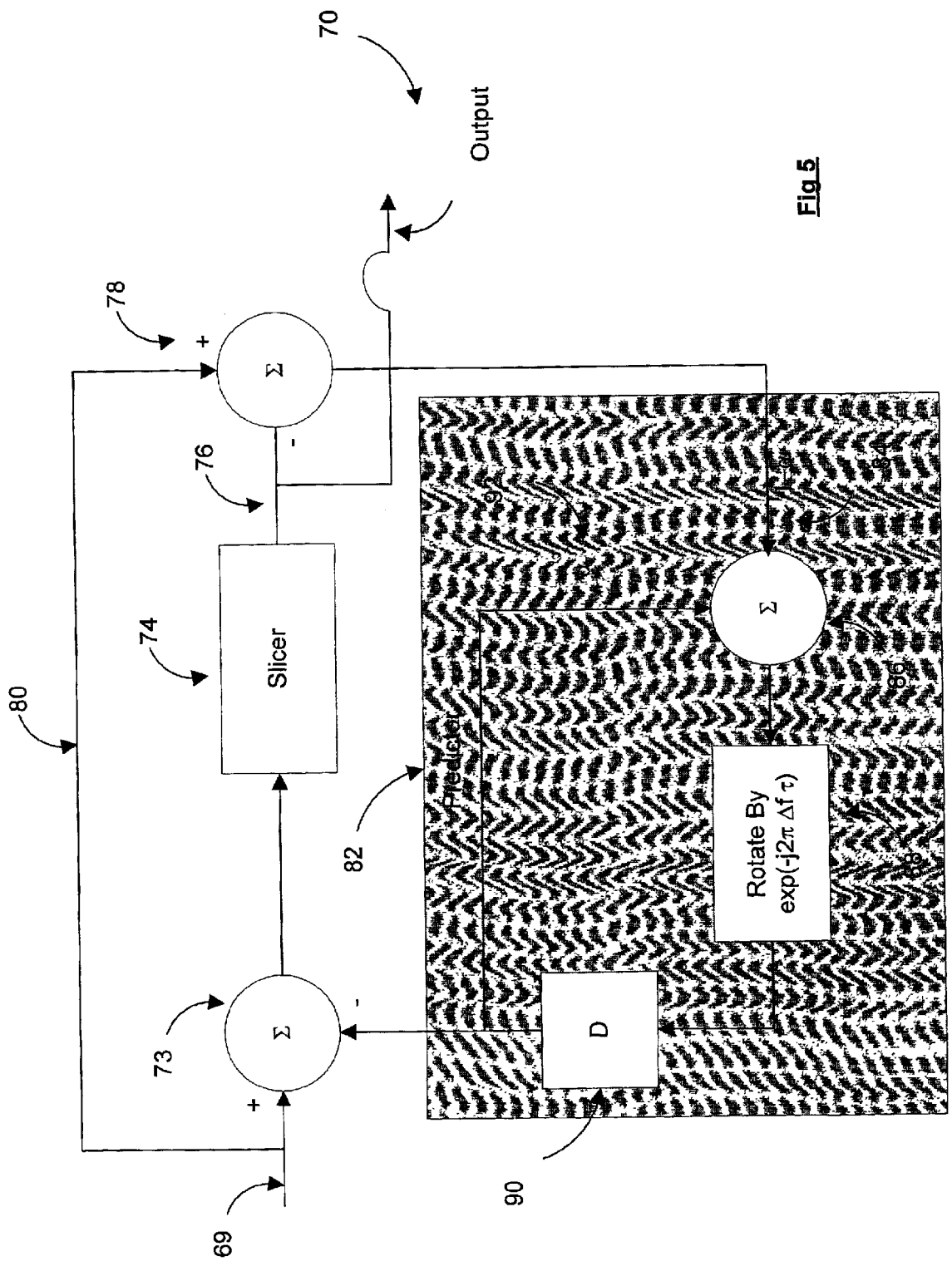

METHOD AND SYSTEM FOR DETECTING, TIMING, AND CORRECTING IMPULSE NOISE

FIELD OF THE INVENTION

This invention is related generally to receiving apparatus for a data communication system. More particularly, this invention is directed to a method and system for detecting, timing, and correcting impulse noise on a data communication channel.

BACKGROUND OF THE INVENTION

Communications systems are used to transfer data between remote transmitting and receiving locations over one or more physical channels. The integrity and reliability of such data transmissions can be compromised by several factors, such as transmission imperfections, receiving imperfections, and physical channel interference. Examples of interference which affect the quality and rate of data transmission include impulses (or bursts), and other short duration events, and long duration interference, such as ingresses. A relatively large effort has been directed to improving the transmitter and receiver robustness for long duration interference. However, compensating for impulse/burst noise has received little attention. Impulse or burst noise can be caused by many uncontrollable events, such as arcing and electrical transients coupled through a power system, lightning, etc. This type of noise typically occurs at unexpected times and lasts for a relatively short period of time (on the order of several microseconds). Because it is broad band in effect, impulse noise is of particular concern in multi-carrier transmission schemes since the impulse noise may affect many, or even all channels simultaneously.

For example, in a multi-tone modulation transmission scheme, a number of carriers positioned at different frequencies are used and data is transmitted simultaneously in parallel over the carriers. Each band carries a fraction of the total information being transmitted. The discrete bands or sub-channels are independently modulated, and each has a carrier frequency at the center frequency of the particular band. For example, multi-tone modulation schemes include DMT (Discrete Multitone modulation), used for DSL channel communication, and VCMT (Variable Constellation Multi Tone), suggested for use in HFC CATV applications.

In one DMT configuration, a 1.1 MHz channel is broken down into 256 sub-channels or bands, each of which is 4 KHz wide. Each sub-channel has its own carrier frequency. Each of the sub-channels is used to transmit a fixed number of information bits in a single symbol or signal period. The DMT system monitors the signal to noise ratio for each of the sub-channels and uses this information to determine how many bits per signal period (symbol) may be carried in each of the sub-channels. The number of bits per signal in a sub-channel is typically referred to as the loading of the sub-channel. The DMT system dynamically adjusts the loading of each of the sub-channels in accordance with the noise characteristics of the sub-channel. If a sub-channel is particularly noisy, it may not be used at all.

VCMT modulation is a transmission scheme specifically designed to effectively combat the high ingress and impulse/burst impairments present in cable TV channels, and also to maximize the data throughput capacity of such channels. Like DMT, data is transmitted over multiple sub-channels, typically 36. However, in VCMT, data is transmitted using a variable bit loading per tone, along with coding and interleaving. The VCMT system measures the noise present on each channel and independently modulates the tone data transmission scheme from QPSK (quadrature phase shift keying) to 256-QAM (quadrature amplitude modulation) accordingly. During operation, the signal-to-noise ratio across the channels are monitored for each tone and the headend receiver instructs the upstream transmitter in the cable modem to modify the QAM constellation for each tone to maintain a desired bit error rate. VCMT also uses spectral shaping to reduce the frequency sidelobes of the tones to thereby reduce the effect of narrowband interference to only the closest tones.

Multi-tone transmission schemes have relatively good noise immunity. However, there is a tradeoff when resistance to impulse noise is considered. Because data is transmitted on multiple channels, the symbol length can be relatively long while still providing a high overall data transmission rate. Both DMT and VCMT have relatively long symbol periods. Thus, each has fairly good immunity (compared to a single carrier signal) from weak time domain events, such as impulses and bursts, because the effect of a short time domain event will be averaged out over the relatively longer symbol period. However, strong impulses are very damaging to DMT transmission because the impulse may simultaneously corrupt all of the 256 symbols occupying the 256 DMT sub-channels. Similarly, strong impulses are also very damaging to VCMT transmissions because the impulse can corrupt the symbols occupying every VCMT sub-channel at the time the impulse hits. In addition, because VCMT uses spectral shaping, neighboring symbols may also be corrupted by the impulse.

Impulses can be corrected by either canceling or blanking. Impulse canceling is a process where the impulse waveform is estimated and then subtracted from the data signal at the appropriate time. Impulse blanking is a process in which the impulse is located in time and the data input is zeroed (or blanked) for the duration of the impulse. Canceling is superior to banking because it preserves the underlying data. However, it is considerably more complex to implement.

Various techniques for compensating for impulse noise are known. U.S. Pat. No. 5,410,264 to Lechleider, which is incorporated herein by reference, describes very basic techniques for impulse detection, timing, and cancellation. The techniques are based on match filtering with a known impulse shape. An impulse is detected by using a match filter and monitoring when the filter output energy crosses a defined threshold. The location of the impulse is estimated to be the single match filter output sample which has the maximum energy. However, the techniques disclosed in the '264 patent are incapable of handling impulses having more than one degree of freedom (e.g., spanned by a basis of more than one vector).

U.S. Pat. No. 5,479,440 to Esfahani, which is incorporated herein by reference, discloses an impulse cancellation technique which compensates for out-of-band impulse noise by filtering out frequency components suspected as impulses. However, the '440 patent does not adequately address in-band impulse noise. U.S. Pat. No. 5,703,904 to Langberg, which is incorporated herein by reference, discusses temporarily inhibiting (e.g., blanking) modem adaptation circuits when an impulse is detected. However, impulses are detected only by using a simple thresholding input signal. Further, no attempt is made to cancel the impulse. A somewhat more detailed impulse detection scheme, using an adaptive threshold, is disclosed in U.S. Pat. No. 5,119,321, which is incorporated herein by reference.

However, none of these prior art impulse detection and compensation schemes provides a robust and efficient impulse detection system which can adequately detect impulses which have two or more unknown (or varying) degrees of freedom. Further, none discloses an efficient scheme for handling strong impulses in a multi-channel transmission system.

Accordingly, it is an object of the present invention to provide a method for compensating for strong impulse interference in a multi-carrier system, such as DMT and VCMT.

It is a further object of the invention to provide an improved technique for detecting and timing impulses which have attributes that span a number of degrees of freedom.

Yet another object of the invention is to provide a system which will reliably detect an impulse, determine its attributes, and then take appropriate corrective action.

Yet a further object of the invention is to provide an impulse detection and correction system which is suitable for in band impulse noise as well as out-of-band impulses.

A further object of the invention is to detect and correct non-stationary noise, i.e., noise which has statistics which change over time.

SUMMARY OF THE INVENTION

This invention is directed to novel methods and apparatus for detecting and correcting impulse noise on a data communication channel. In one embodiment of the invention, a dual-detection scheme is used. The communication signal, which can be a single carrier signal or a multi-carrier signal, is input to two or more separate impulse detectors, each of which uses a different impulse detection scheme. Preferably, complementary detection schemes are used such that the weaknesses in the first detection scheme are countered by the strengths in the second detection scheme, and vice versa.

The outputs of the impulse detectors are provided to an impulse correction enable circuit which uses the impulse detection signals to determine when an impulse is present and produces an output indicating that corrective action should be taken. Preferably, more than one corrective action can be taken and the enable circuit further indicates what corrective action to take. The received signal is also provided to the impulse correction circuit, such as a canceling/blanking circuit. In accordance with the output of the enable circuit, the impulse correction circuit corrects for impulse noise by, e.g., subtracting an estimated impulse waveform from the data signal at the appropriate time or by blanking the data signal for the duration of the impulse. The output of the impulse correction circuit can be sent directly to subsequent components, such as a decoder. Preferably, and according to another aspect of the invention, the output of the pulse corrector is provided to a reliability estimator and selector. The original (uncorrected) data signal is also input to the selector. The selector compares the corrected and uncorrected input signals and determines which is more reliable. The most reliable signal is then selected and provided to subsequent components.

Various impulse detection schemes can be used. One preferred and novel impulse correction scheme is based on utilizing the high intertone impulse correlation generated when an impulse hits a multitone symbol. When a short impulse hits a multitone symbol that is longer than the impulse duration, the noise phasors inflicted on neighboring tones are very similar. This similarity can be quantified by computing the cross correlation among neighboring tones, which would thus be close in absolute value to 1 (the phase depends on the timing of the impulse within the symbol). The high cross correlation is utilized for estimating impulse timing and for estimating the impulse noise waveform.

In particular, the new impulse detection/correction scheme uses quiet tones (sub channels) among the multiple channels in the data link wherein a fraction (typically a few percent) of the sub channels are not used for data transmission. According to this aspect of the invention, the signals on the quiet tone channels are uncorrupted by any transmit signal and therefore can be used to accurately detect the presence of an impulse. Because of high cross correlation of impulse noise across all channels, an impulse detection in a quiet-tone can be used to indicate an impulse on other channels as well. Most preferably, impulses are detected and their timing estimated based on a Gram Schmidt orthogonalization process.

The new Gram Schmidt scheme provides superior impulse timing and shape estimation. However, it is less accurate when multiple impulses are present in a short time period. Accordingly, when used in a dual-detection scheme, a complementary detection scheme which more accurately detects multiple impulses should be used. Preferably, a detection scheme based on a signal energy moving average window is used.

In addition to detection of impulses, new methods of canceling impulses are also presented, including a linear least square scheme, and a decision feed back scheme.

The new technique for detecting and canceling strong impulses can be used in conjunction with multitone transmission schemes, such as DMT and VCMT, to solve their vulnerability to impulse noise. However, the new method is not limited to multitone modulations, but also is suitable for other types of communication schemes, such as CDMA and single carrier modulation, and even non-communication signals. Furthermore, by applying the present method but switching the model time and frequency axes, the invention can be used to acquire the frequency of fast rising or changing ingresses (narrow band interference) and cancel them accordingly. In addition, in some data transmission and reception schemes, received and amplified signals may be subjected to clipping. The effect of clipping on a signal is similar to that produced by impulse noise. The present invention may also be adapted to detect and cancel noise generated by clipping, thus permitting the use of less complex and expensive receiving circuits.

BRIEF DESCRIPTION OF THE DRAWINGS

The foregoing and other features of the present invention will be more readily apparent from the following detailed description and drawings of illustrative embodiments of the invention in which:

FIG. 5 is a block diagram of a decision feedback impulse cancellation module.

DETAILED DESCRIPTION OF THE PREFERRED EMBODIMENTS

Figure 1:
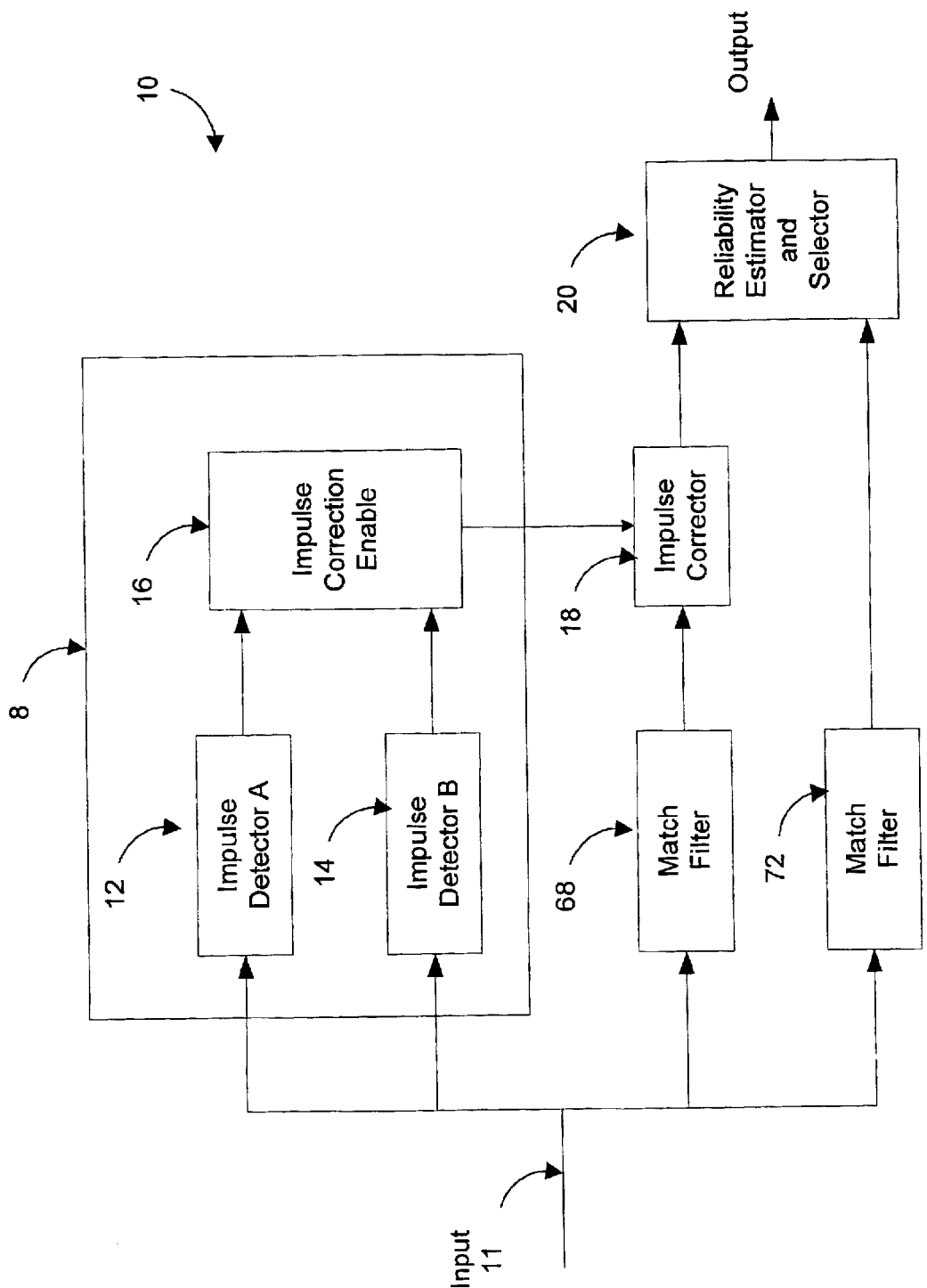
FIG. 1 is a block diagram of an impulse detector and corrector.

Turning to FIG. 1, there is shown a block diagram of an impulse detector and corrector system 10 according to the invention. The received input communication signal 11, which can be a single carrier signal or a multi-carrier signal, is input to an impulse detector 8, which preferably comprises two or more separate impulse detectors, 12, 14, each of which uses a different impulse detection scheme. The outputs of the impulse detectors 12, 14 are provided to an impulse correction enable module 16. The signals produced by the impulse detectors 12, 14 indicate when an impulse has been detected and may contain information about the detected impulse itself. The correction enable module 16 uses the information contained in the impulse detection signals to determine when an impulse is present and signals via its output that impulse correction is required.

In the preferred embodiment, the outputs of two or more separate impulse detectors are used to determine the timing and possibly shape of an impulse. Thus, the results are generally more accurate than if a single impulse detector is used. Further, the use of multiple detectors permits the use of complementary detection schemes, wherein weaknesses inherent in a first detection scheme are countered by the strengths in a second detection scheme and vice versa. Preferred detection schemes are discussed in detail below.

Impulse correction can be by cancellation or blanking. Preferably, both methods are available. In such a situation, the output of impulse detector 8 indicates whether the impulse should be canceled or blanked. When two or more impulse detectors 12, 14 are used in impulse detector 8, the selection of which correction method to use is made with consideration as to the accuracy of the impulse detection schemes in use and how well the impulse waveform can be predicted in various circumstances. If the impulse correction enable circuit 16 determines that an accurate waveform can be generated, an indication to cancel the impulse is output. Otherwise, an indication to blank the impulse is output.

An impulse corrector module 18 is provided which receives the input signal 11, pre-processed by a match filter 68 if necessary, and the output from the impulse detector 8 (correction enable 16). In accordance with the signal output from the impulse detector, the impulse correction module 18 corrects for the detected impulse noise by, e.g., subtracting an estimated impulse waveform from the data signal at the appropriate time or by blanking (zeroing) the data signal for the duration of the impulse. The output of the impulse correction module 18 can be sent directly to subsequent components, such as a decoder. Preferably, however, the output is provided to a reliability estimator and selector 20, which also receives as input the original (uncorrected) data signal, pre-processed by a match filter 72 if necessary. Selector 20 evaluates the corrected and uncorrected data signals to determine which is more reliable. The most reliable signal is then selected and provided to subsequent components. As can be appreciated, the dual-output path can be implemented using a variety of impulse detectors. Preferably, however, a dual-path impulse detector, such as described below, is used.

Figure 2:
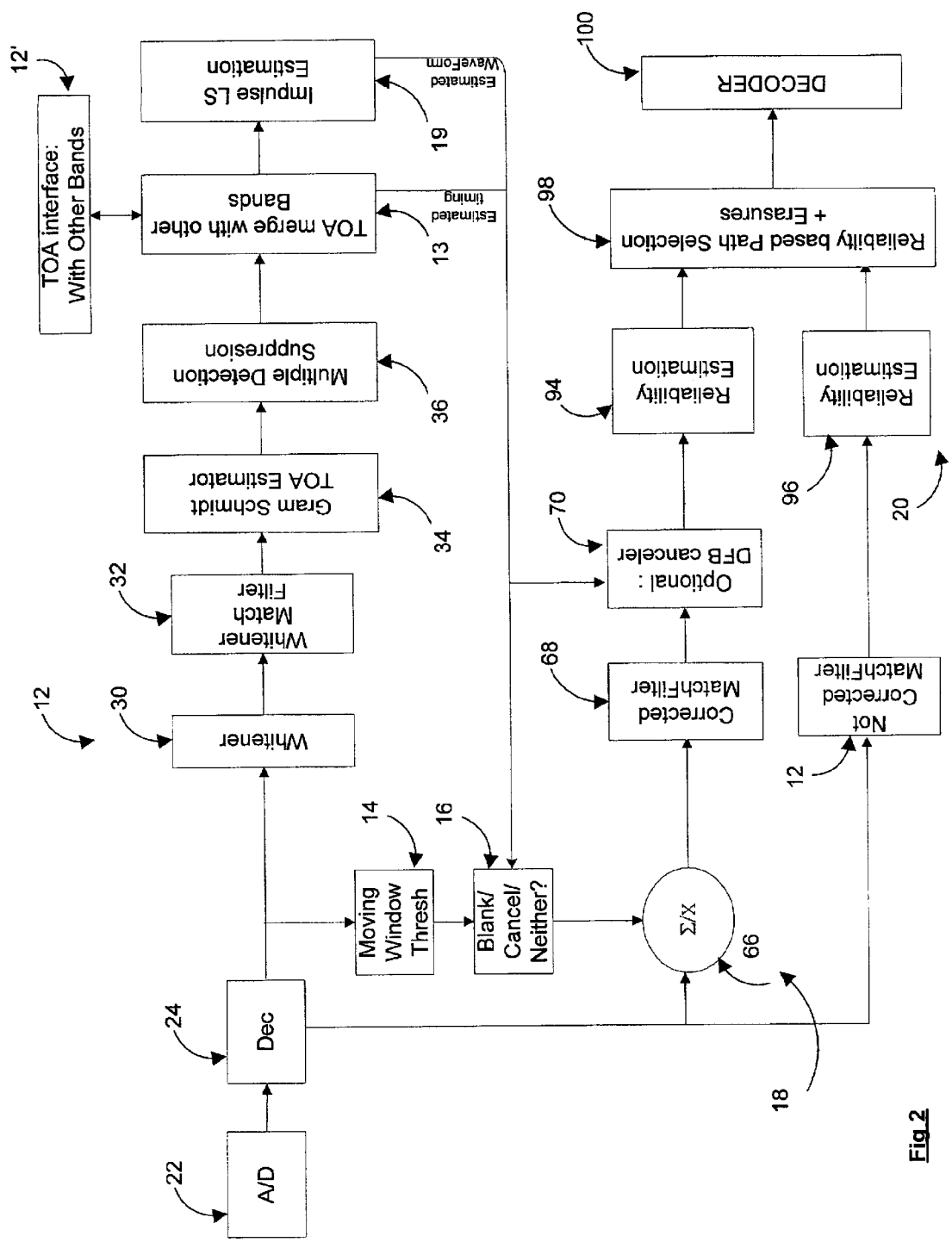
FIG. 2 is a detailed block diagram of one embodiment of the impulse detector and corrector of FIG. 1.

Turning to FIG. 2, there is shown a detailed block diagram of one embodiment of the dual-path impulse detector and corrector 10 of FIG. 1. In this embodiment, a novel Gram Schmidt-based impulse detection scheme which detects impulses and estimates their timing primarily through the use of quiet tones in a multi-tone transmission is used for the first impulse detector 12. A moving window threshold impulse detection scheme that detects impulses by thresholding the signal energy of the entire signal plus interference is used for the second impulse detector 14. These impulse detectors are configured for use in data transmission schemes, such as DMT and VCMT, which use multiple data transmission sub-channels, and are discussed in more detail below with reference to FIGS. 3 and 4, respectively.

Also shown, although not technically part of the detector and corrector 10, is an analog and digital front end comprising an A/D converter 22 and a decimator 24. The received analog data signal is sampled by A/D converter 22 at a rate sufficient to prevent aliasing of the data signals. Because of the difficulty of implementing high roll off analog filters, the sampling rate is usually considerably higher than required by the Nyquist Rate. To reduce the sampling rate to a value closer to the Nyquist frequency, the sampled signal is decimated by decimator 24 to produce the input signal 11 which is subsequently processed by the impulse detector and corrector 10. The front end may also contain standard timing and frequency loops. These are well-understood components to those skilled in the art and will, thus, not be described in detail.

The Gram Schmidt impulse detection method produces data which is suitable for estimating the waveform of a detected impulse. The output of detector 12 is used by an impulse estimator 19 which estimates the impulse waveform. This information is used later for impulse cancellation, when appropriate.

To further improve the accuracy of one or both of the impulse detectors, timing information from analogous detectors operating in neighboring signal bands may be shared and merged. Because impulses are typically wide enough to cover many adjacent receiver bands, sharing and merging impulse detection information from multiple detectors operating on adjacent bands can further improve the accuracy of the detection. For example, as shown in FIG. 2, the output of neighboring band impulse detectors analogous to detector 12 is provided via TOA interface 12 to a module 13 which merges the impulse time of arrival (TOA) determined by detector 12 and its neighbors. The weight to be given to the neighboring band impulse detection information when merging this information is dependent on the degree to which impulses are expected to cross multiple bands. Various merging methods will be apparent to those of skill in the art. This feature is discussed further below.

In addressing the operation of the various impulse detectors and other aspects of the invention, it is useful to define various terms and parameters. The signal input to the system is comprised of the Xmit signal (transmitted from remote transmitter), stationary noise sources (e.g. white noise or narrow band noise), and impulses. From the point of view of the impulse detection and correction mechanism, the impulse is the signal of interest while the Xmit signal and stationary noise sources are the unwanted interfering signals. These unwanted signals are referred to herein as the background noise.

It will be assumed that impulses to be detected have an expected length of L. If the detector 10 is used when impulses of indeterminate length are expected, the methods for detecting impulses of a known length L discussed below may be repeated with each possible L. In addition, the following parameters will be used in the following discussion of impulse detection and correcting schemes, as well as in the mathematical appendices:

NTones—Number of tones (sub-channels, carriers) in the multi-carrier communications channel $M_{GS}$—Gram Schmidt matrix of size (L*L), time dependent for DMT (see derivation in appendix)

$M_{LS}$—Least square impulse estimation matrix of size (L*L), time dependent for DMT $TH_{GS}$—Gram Schmidt window energy threshold.

$TH_{MW}$—Moving window energy threshold.

Figure 3:
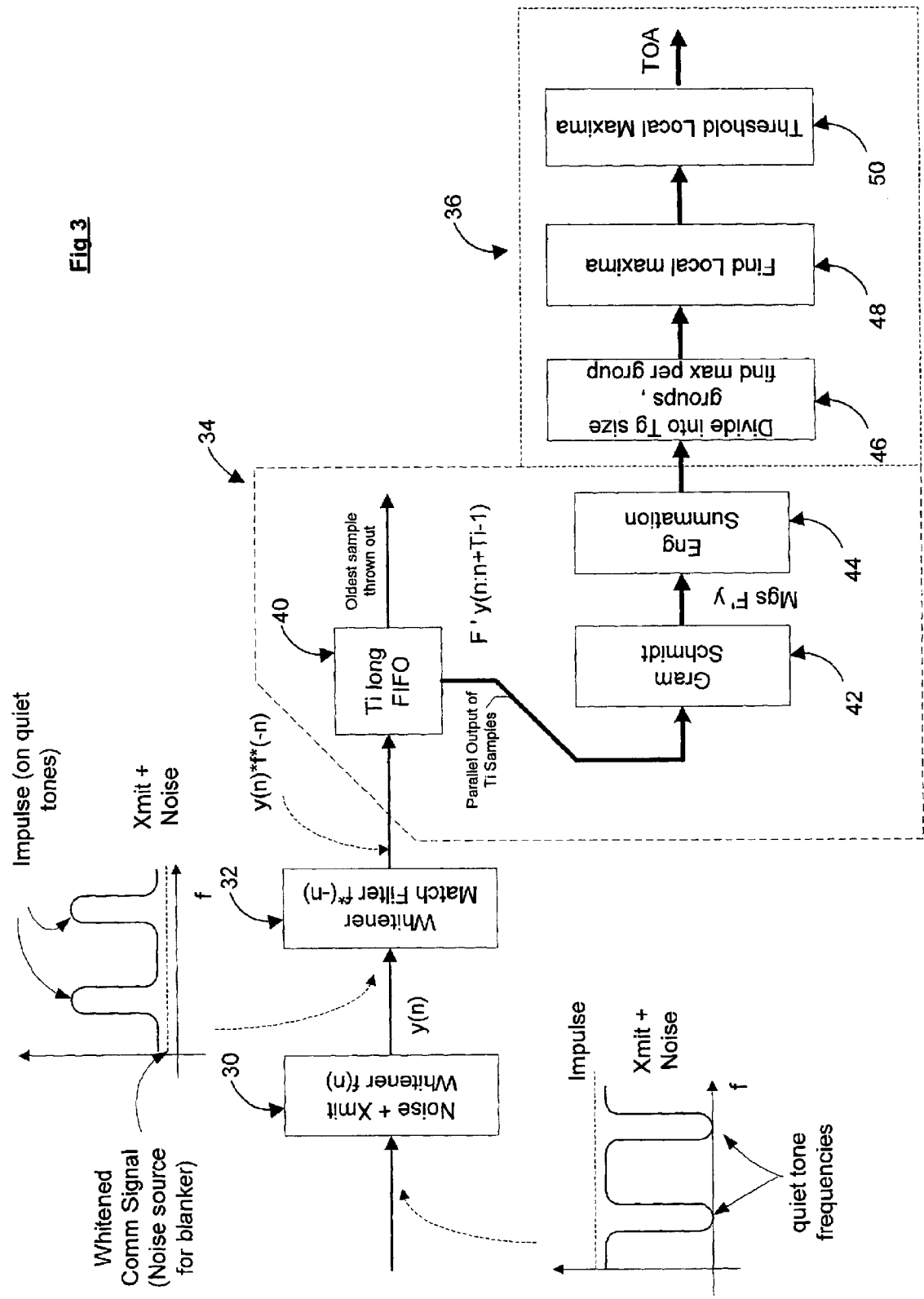
FIG. 3 is a block diagram of a Gram Schmidt-based impulse detector.

$TH_{ERA}$—Erasure threshold used by the reliability detector $T_G$—The size of group on which local maximization is performed as part of Multiple Detection Suppression NN—The number of neighbors used when merging impulse detection TOA information from other bands $\Delta f$—The carrier frequency difference between successive tones f(n)—The impulse response of the whitener 30 (FIG. 3)

$G_K$—gain at center frequency of tone K when viewing f(n) in frequency domain y(n)—Signal at output of whitener 30 (FIG. 3).

σ—The background noise power after being whitened by whitener 30.

α—The memory of the decision feed back impulse canceler

Turning to FIGS. 2 and 3, the impulse detection using the new Gram Schmidt-based detection will now be discussed. According to one aspect of the invention, the input signal 11 is initially processed to accentuate impulses which may be present relative to other signals on the NTones sub-channels being considered. The preprocessing makes use of quiet tones, e.g., sub-channels which are not being used to transmit data, and therefore only contain noise from stationary sources. More particularly, the input signals are processed by a whitening filter 30 which equalizes the noise in the input signal and produces an output y(n). The whitening filter 30 has an impulse response f(n), that provides a gain of $G_K$ at the center frequency of tone K. The gains $G_K$ are selected to whiten the input background noise (input to 30), as a result the noise at output of whitener 30 is primarily a σ power white Gaussian noise. Various whitening schemes are known to those of skill in the art.

The sub-channel(s) designated as quiet tones can be selected arbitrarily. However, there are performance differences between different quiet tone arrangements, as will be appreciated by one of skill in the art. One way to assess the merits of a certain arrangement of quiet tones is to plot the combined impulse response of the whitener 30 and whitener match filter 32, (i.e., f(n)*f*(−n)). In a preferred quiet tone arrangement, the combined impulse response at the middle of the impulse is maximized while the impulse response at other locations is minimized.

Coefficients of the whitener filter 30, as well as the coefficients of the detection matrix $M_{GS}$ generated for use in the impulse detection routine, and discussed below, are generated in accordance with dynamic measurements of the noise power spectrum of the input signal. The background noise is preferably continuously measured and the relevant matrices and filters updated accordingly. Because changes in background noise are relatively slow, the matrix update rate can be low. Background noise measurement can be done using conventional techniques, such as averaging of the per-tone-energy of slicer errors, where the slicer error is the difference between the slicer input and output.

Data signals are not transmitted on the quiet tone sub-channels. Thus, these sub-channels (in the absence of an impulse) contain only the stationary noise sources. The power spectrum for these channels will therefore be considerably lower than that on the sub-channels used to transmit data (i.e., those with the higher "background noise") and so, during the whitening process, the data carrying sub-channels will be attenuated far more than the quiet tone sub-channels. As a result, when an impulse is present, it will have a much larger effect on the power level in a whitened quiet tone when compared to the power level of the sub-channels which are carrying data tones. This effect is graphically illustrated in the input and output graphs adjacent the whitener filter 30 shown in FIG. 3.

The output of the whitener filter 30 is passed through a whitener match filter 32. This filter has a transfer function which is the complex conjugate of the whitener, i.e., f*(−n) and produces from input y(n) an output equal to y(n)*f*(−n). The whitener match filter 32 functions to collect the energy from an impulse into a short interval having duration similar to the impulse.

The whitener filter 30 and whitener match filter 32 are preferably implemented as frequency-domain multiplications, although time convolution can be used instead. For frequency-domain, a filter bank is used that analyzes the input to the whitener 30, and then applies a per-band gain for the whitener, then a per-band gain for the match filter 32, and finally, combines all bands into one wider signal, e.g., by using a filter bank. The per-band whitener gain and the per-band whitener match filter gain can be combined into one gain (i.e., multiplied) to reduce complexity. Efficient implementation of a filter using filter banks is well-known to those skilled in the art.

Following the whitener and whitener match filters 30, 32, the processed signal is fed to the Gram Schmidt Impulse TOA estimator 34, shown in detail in FIG. 3. First, the processed signal is fed to a FIFO 40 having a length L equal to the estimated length of the impulse. Each time a new sample enters FIFO 40, the oldest sample is discarded. The output of FIFO 40 is a parallel column vector of height L.

Next, the vector output of the FIFO 40 is left multiplied by a Gram Schmidt matrix $M_{GS}$ of size (L*L) in Gram Schmidt module 42. The output of Gram Schmidt multiplication 42 is a column vector of height L, where each component of the vector represents the projection of the impulse on one of the Gram Schmidt (orthogonal) basis vectors. In general, multiplication by matrix $M_{GS}$ transforms values that are the results of correlation with the match filter (i.e., f*(−n)) into projections on the Gram Schmidt basis vectors. The specific form of matrix $M_{GS}$ is dependent on the type of data transmission scheme at issue. Detailed derivations of the Gram Schmidt matrices for VCMT and DMT are presented in Appendixes A–C, below. Similar analyses can be used to derive the appropriate Gram Schmidt matrix for other data transmission schemes, as will be understood by those of skill in the art in view of the present disclosure. In addition, while the appendixes present a derivation of some implementations of various aspects of the present invention, the invention is not limited to an implementation which adopts the precise mathematical relationships discussed in the appendixes and various adjustments to the parameters and mathematical relationships may be made while still falling within the overall scope of the invention.

The column vector output of Gram Schmidt module 42 is processed by Energy Summation module 44. Summation module 44 sums up the square values of the coordinates of the input vector. This value represents the (estimated) net impulse energy after being filtered by the whitener filter for the impulse samples which are contained in FIFO 40. Thus, the value can be used to determine whether an impulse is present and, if so, when it occurred.

As an artifact of this impulse detection scheme, the impulse energy may be smeared across several time points. In particular, a genuine impulse will generate a high-energy sample at the output of energy summation 44 which has a temporal location corresponding to the TOA of the impulse. However, and in addition, the impulse will generate lower energy values at small distances from the actual (correct)

TOA of the impulse. This leaked energy is usually significantly lower energy than the energy present at the impulse's TOA. To avoid erroneous multiple detections, a Multiple Detection Suppression module 36 is used.

In a preferred embodiment, Multiple Detection Suppression module 36 comprises three sub-modules as shown in FIG. 3. Group divider 46 divides the vector input into several non-overlapping groups of size $T_G$ and identifies the maximum energy point in each group. These group maximums are provided to a Local Maxima Detector 48. Energy values that are higher than a previous group and not lower than a subsequent group are passed to Threshold Local Maxima module 50. (Only immediate neighboring groups are considered. This is the usual Local Maxima Detection). Finally, local maximas that are higher than a predetermined energy threshold, $TH_{GS}$, are identified. The temporal position of those identified maximas corresponds to the TOA of an impulse. It should be noted that the final TOA is not the timing of the local maxima achieving group, but the timing of the maximum sample within that group.

Thus, multiple detection suppression module 36 acts to remove the false alarms and pass on only the true impulse detection using local maximization and assuming that the true detection energy is higher than the surrounding energy. The size $T_G$ determines the size of the area in which local maximization is performed. The Local Maxima Detector 48 assures that two impulse detections are at least $T_G$ apart. It can be appreciated that increasing $T_G$ reduces false alarms but also reduces the probability of genuine impulse detection. (In cases when two genuine impulses occur in an interval shorter than $T_G$ samples, one of the impulses would be discarded by this process.) Those of skill in the art will recognize that there are a variety of other techniques for multiple detection suppression, each having various tradeoffs between false alarm rates, probability of impulse detection, and complexity.

This impulse detection scheme can be modified in several ways. One variation is removing the Gram Schmidt multiplication (in module 42). This can easily be accomplished by setting $M_{GS}$ to the identity matrix. As a result, the energy summation will compute the energies in the output vector of FIFO 40 directly. This reduces performance but also reduces complexity since $M_{GS}$ does not need to be computed. An alternative option is available if a good prediction of the impulse power is available in advance. If so, this information can be incorporated into matrix $M_{GS}$.

As discussed above, and with reference to FIG. 2, there are cases where a channel is divided into multiple successive bands, each of which is utilized by a different set of modems. Typically the same transmitter and receiver hardware is used, but located at different non-overlapping bands. For example, in an HFC channel, a 35 MHz upstream channel (5–40 MHz) may be divided into successive 1.6 MHz bands. On each HFC band, there are multiple transmitters (e.g., the cable subscribers) and a single receiver at the Head End (cable central office). In many channels, impulse noise has a wide enough bandwidth to affect multiple successive modem bands. Advantageously, the timing of impulses on each band is detected independently, and then the multiple detection information is combined to obtain a refined estimation.

In the preferred embodiment, a local TOA estimation is output from detector 12 and which, when a Gram Schmidt detector is used, includes sample energy found by Local maximizer 48 after multiple detection suppression. This data is broadcast to neighboring bands via the TOA interface 12'.

At the same time, neighboring band receivers also broadcast their multiple detection suppressed TOA's (including sample energy found by their respective local maximizers). The TOA interface 12' receives the TOA's of neighboring bands and sends them to the TOA Merge module 13 which combines this data with the local TOA estimation.

In a preferred implementation, the TOA estimates are combined using a weighted average, where weight is related to the TOA sample energy. There are other possible TOA merge algorithms, with tradeoff being between estimation noise and complexity. For example, the merge may be based on a median computation on all the TOA's, where the sample weight is interpreted as a TOA repetition used for the median computation.

When TOA information from multiple bands is merged, it is possible to vary the distribution of quiet tones in ways not possible without this data sharing. In one embodiment, the quiet tones are distributed evenly among different bands, in which case there will be similar TOA estimations of similar reliabilities from all bands. In another embodiment, the quiet tones can be distributed unevenly. In an extreme case, one band may host all of the quiet tones, and all other bands may use its estimation directly.

Figure 4:
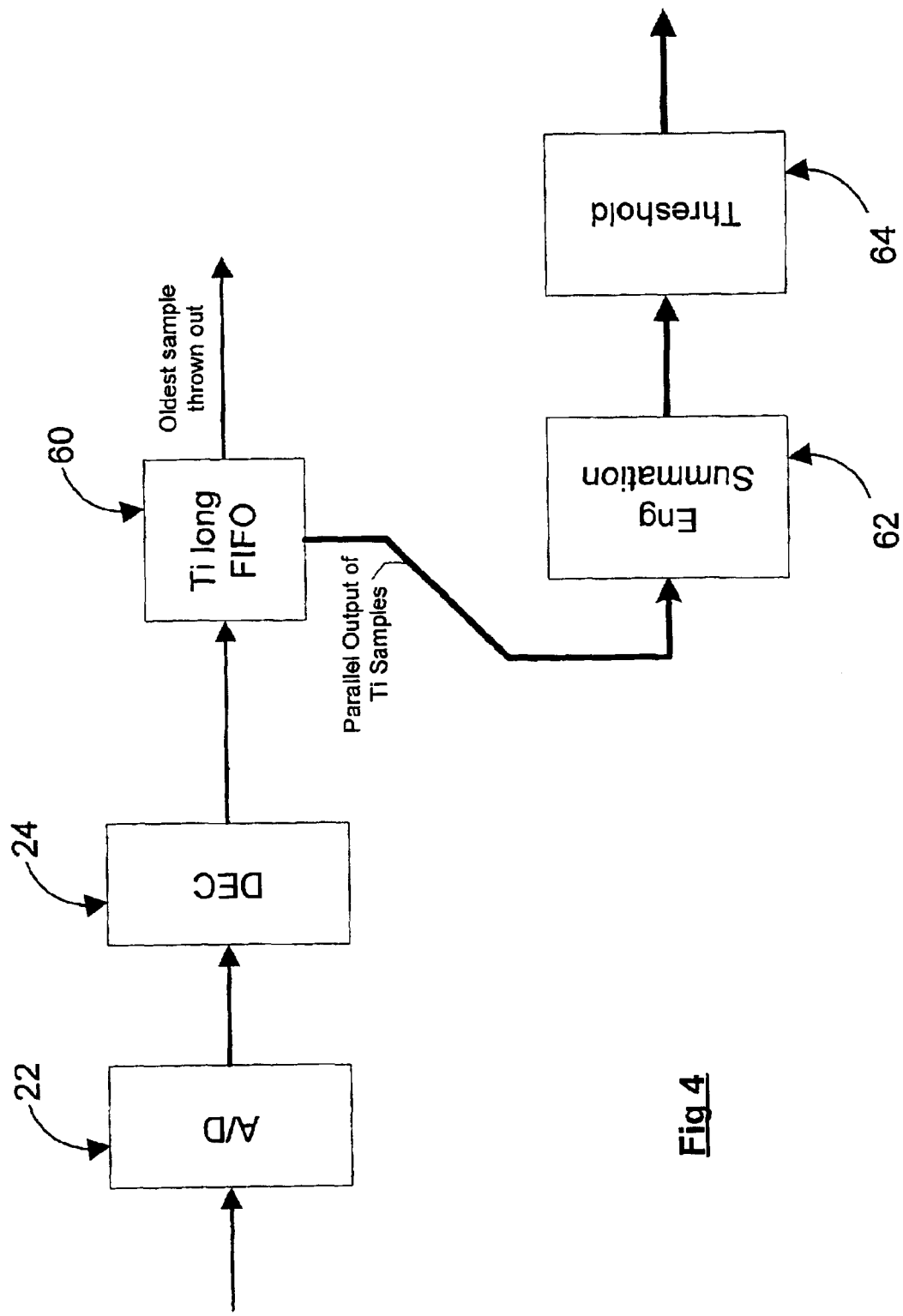
FIG. 4 is a block diagram of a moving window impulse detector.

Turning to FIG. 4, there is shown a block diagram of a moving energy window impulse detector, here implemented as impulse detector 14. As shown, the output of decimator 24 (which is not considered part of the detector) is fed to FIFO 60 having length L. Each time a new sample enters the FIFO 60, the oldest sample is discarded. The contents of the FIFO 60 are output in parallel as a vector of length L. An energy summation module 62 receives the FIFO 60 output and generates the sum of the square values of the coordinates of this vector. The energy values received from energy summation module 62 are compared to $TH_{MW}$, the moving window impulse threshold by thresholding module 64. All sample times comprising windows having energy higher than $TH_{MW}$ are considered to contain an impulse.

A variety of other ways of implementing a moving window impulse detector can also be used. The particular implementation used is largely dependent on the implementation technology (e.g. DSP, ASIC etc.). For example, a moving window of length L may be implemented using an accumulator. The accumulator is first set to the sum of energies (squares) of L consecutive samples, giving the initial moving window a value. Then, each time the moving window is advanced, one sample (in time), the energy of the oldest sample is subtracted from the accumulator and the energy of the new sample is added, thus the accumulator energy then corresponds to the new set of samples.

A disadvantage of the moving window detection scheme is significantly less accuracy in impulse timing estimation vs. the new Gram Schmidt process, discussed above. The moving window is capable of detecting nearby impulses and estimating their timing only if the impulses are significantly strong compared with the Xmit signal, since the Xmit signal is an interfering noise relative to impulse detection. The Gram Schmidt scheme, by primarily relying on the quiet tones where the Xmit signal does not interfere, achieves superior performance. The background noise, and not the Xmit signal strength, limits the Gram Schmidt performance. In most cases of interest, the background noise is much weaker than the Xmit signal.

However, the moving window impulse detector is good at detecting situations where multiple impulses occur close together while the Gram Schmidt timing detection is not accurate in detecting closely spaced impulses. If the value of $T_G$ is small, a high false alarm rate will result. If, on the other hand, $T_G$ has a large value, there will be a large number of missed impulse detections because only one impulse is assumed to occur within $T_G$. Because the strengths and weaknesses of these two impulse detection schemes complement each other, they are well matched for implementation in the dual-detector scheme shown in FIG. 1.

As shown in FIGS. 1 and 2 and discussed above, in one embodiment of the invention, two methods of correcting impulses—cancellation and blanking—are implemented. In order to determine which type of correction scheme to use, the detection signals from the two impulse detectors 12, 14 are evaluated by an impulse correction enable module 16. As noted previously, impulse cancellation refers to an estimation of the impulse signal, i.e., by Gram Schmidt 34 (timing only) coupled to an impulse estimator module 19, and subsequent subtraction of the estimated impulse from the data received signal at summer/blanker 66 (FIG. 2). If the estimate is accurate, cancellation removes the impulse from the received signal altogether. The Gram Schmidt 34 TOA estimation coupled with an estimated waveform from impulse estimation module 19 are capable of estimating and canceling only short and separated (in time) impulses. (The impulse duration and impulse separation supported by Gram Schmidt depend on the number of quiet tones and on their placement).

In contrast, impulse blanking refers to zeroing the match filter input at summer/blanker 6 for the duration of the impulse as determined, e.g., by the output of the moving window threshold detector. Blanking removes the impulse noise but introduces a new impairment because of the Xmit signal zeroing (for the duration of the impulse). Signal zeroing manifests itself by loss of Xmit energy and, more importantly, by inter-symbol interference (ISI) and inter-tone interference for multitone (ITI). This penalty makes blanking advantageous only for those impulses having an instantaneous power which is strong, when compared with Xmit signal carrier power, making recovery of the Xmit signal unlikely. Moreover, a moving window TOA estimation is effective only for strong impulses, making blanking useful with strong impulses only. In general, it is better to use cancellation if possible.

In the preferred embodiment, where the complementary Gram Schmidt and moving window impulse detection schemes are used, the correction enable module 16 is configured to determine whether to use Impulse Cancellation or Impulse Blanking based on the relative strengths and weaknesses of these methods. If an impulse is detected by Moving Window but not Gram Schmidt, then blanking is used. If an impulse is detected using Gram Schmidt but not Moving Window (as when the impulse is too weak for Moving Window detection), then cancellation is used. If an impulse is detected by Gram Schmidt at a first TOA, and an impulse is detected using Moving Window in the vicinity of that TOA, then, if the moving window detections coincide with the first TOA, cancellation is used. Otherwise, if the Moving Window detections do not coincide with the first TOA, blanking in the detected impulse interval is used. Logic circuits or programs to implement this decision process can be easily generated by those of skill in the art. If other types of impulse detection modules are used, the operation of the enable module 16 may need to be adjusted accordingly, as is well-known in the art. In addition, the enable module 16 can also be configured to combine impulse detection data from more than two different detection schemes and act accordingly based on the relative strengths and weaknesses of the implemented schemes.

Impulse blanking is performed according to the TOA of the impulse as detected by, e.g., the Moving Window detector. The number of samples blanked corresponds to the length L of the moving window on which the impulse was detected. More precisely, the L consecutive samples output from decimator 24 (FIG. 2) that were grouped by FIFO 60 and identified as an impulse by thresholding their energy, are zeroed by summer/blanker 66 at the input of match filter 68. Other samples (i.e., those which were not declared to be an impulse) are not altered. Various techniques may be used for canceling a detected impulse. Two alternate methods are preferred—a linear Least Square (LS) cancellation scheme and a Decision Feedback (DFB) cancellation scheme.

In a Least Square cancellation scheme, impulse LS Estimation 19 is configured to estimate impulse coefficients in the time domain using data gathered by examining the quiet tones. The estimated impulse waveform is then subtracted by the summer/blanker 66 from the received signal. The impulse LS estimation is performed on the L consecutive samples output of whitener match filter 32 that were grouped by FIFO 40 and then identified by Gram Schmidt module 42. The estimation is performed by multiplying the L long sample vector from FIFO 103 with matrix $M_{LS}$ (which is an L*L matrix). For reference, one derivation of this impulse Least Square estimation is provided in Appendix B. Other methods known to those of skill in the art can also be used.

Decision Feed Back (DFB) impulse cancellation is an iterative process that uses a slicer output for Tones 1 ... K–1 to predict impulse inflicted noise on a Tone K. The technique is somewhat similar to using Decision Feedback for ingress (narrow band interference) cancellation in single carrier systems (but swapping time and frequency domains) because once the impulse timing is available from the Gram Schmidt process, the problems of multitone impulse cancellation and single carrier ingress cancellation become similar. Despite its relative complexity, the advantages of DFB over least square cancellation are numerous.

Far fewer quiet tones are needed for DFB impulse cancellation versus LS cancellation. In Least Square Cancellation, the accuracy of the estimation degrades as the quiet tones frequency separation is increased since the cross-correlation of impulse inflicted noise between tones decays as tones are separated in frequency. Thus, the wider the Xmit signal bandwidth as compared with the reciprocal of impulse duration, the more quiet tones are needed. In contrast, a DFB impulse canceler refines the impulse estimation, going from Tone K to Tone K+1, and therefore has no such limitation. In fact, if the background noise is ignored, even a single quiet tone for DFB cancellation can be suitable for accurate results. A further advantage is that there is lower leftover impulse estimation noise after cancellation. The impulse estimate is refined from one tone to the next. Thus, the final estimate is based on many more sample tones than are examined in Least Square cancellation.

When DFB impulse cancellation is implemented, the impulse TOA stimation, e.g., as output from the merge module 13 is provided directly to DFB module 70 (FIG. 2). In one embodiment, the summer/canceler 66 does not need to subtract an impulse estimation (such as from LS estimation) or blank. Rather, it just passes the signal on to match filter 68. The output of match filter 68 is fed to the DFB module 70 which does the actual impulse cancellation. Other arrangements are also possible.

FIG. 5 is an illustration of one embodiment of DFB 70. For simplicity, it will be assumed that there is only one quiet tone and it is the tone having the lowest frequency. The per-tone complex values (i.e., (I,Q) s) output of match filter 68 are provided as input 69 to DFB 68 in increasing order of tone frequency. (These complex values are composed of Xmit signal plus impulse noise plus background noise.)

Adder 73 subtracts a current impulse prediction (which is output of rotator 88) from the complex value of the input 69, thus removing its impulse noise component. The cleaned complex value output of the adder 73 is then provided to slicer 74 which finds the nearest valid constellation point (i.e., slices). The output 76 of slicer 74 is then fed to a reliability estimator 94 (FIGS. 1, 2), discussed below, and eventually to the decoder 100.

Assuming that the slicer 74 had made no error, the true Xmit signal is provided to adder 78 which subtracts the true Xmit signal from the complex value input at 69 (and transferred to adder 78 input along signal 80), where the input at 69 is composed of Xmit signal plus impulse noise plus background noise. This leaves only the impulse noise plus background noise at the output of adder 78. This background noise corrupted impulse estimation is input to Predictor 82.

The Predictor 82 multiplies its input by $(1-\alpha)$ at 84. The adder 86 sums the previous predictor output from delay buffer 90 multiplied by $\alpha$ at 92 with the multiplied output at 84. The coefficient $\alpha$ is the memory of the predictor, e.g. $\alpha=1$ means ignore current sample (use only memory), while $\alpha=0$ means ignore the past samples (no memory). When the rotator 88 is included, the result is essentially a single pole passband filter. The properties of rotator 88 determine the center frequency of the passband filter. The rotator frequency $\omega$ (in radians) corresponds to the impulse timing $\tau$ from 50 multiplied by frequency difference $\Delta f$ between successive tones, i.e., $\omega=2\pi\Delta f\tau$.

The impulse estimation needs to be rotated from Tone K to Tone K+1 because the tones have different carriers. Since the tones have different carriers, the same is true for their match filters in match filter 68, and the match filters directly rotate the impulse (a part of the filtering operation). Also note that for the quiet tone itself, the output of the slicer 74 is set to zero since nothing was transmitted on that tone.

In the event that there is only one quiet tone, but it is the tone at the highest frequency, the same process can be used, but starting from the highest frequency tone and going down to the lowest frequency tone. In this case, the rotator frequency $\omega=-2\pi\Delta f\tau$. In case there is a quiet tone that is not located in one of the extreme tones, but is somewhere in the middle, the DFB cancellation can be divided into two parts. First, the DFB can propagate from Quiet tone up and handle all higher frequency tones, and then can propagate down from Quiet tone to all lower tones. If there is more than one quiet tone, each tone can be used to cleanup its neighboring tones.

There are many ways known to those of skill in the art to construct the predictor 82 of DFB canceler 70, trading off complexity and accuracy. For the sake of simplicity, a rather simple first order predictor is preferred. Alternatively, for example, an N th order FIR predictor may be calculated directly from impulse noise cross-correlation among different tones. If the impulse is modeled as the gating on of a white gaussian noise source for the duration of the impulse, the random signal consisting of impulse samples on different tones is a stationary process having a sink shaped cross-correlation (among tones). The use of stationary random signal cross-correlation to build predictors is known to those of skill in the art. Also, using the equality $(1-\alpha)X+\alpha Y=X+\alpha(Y-X)$, the one pole predictor 82 may be constructed using one multiplier and two adders instead of two multipliers and one adder. This transformation may reduce complexity for some implementations.

While the system and method of the preferred embodiment selects whether to blank or cancel a detected impulse, alternately the system can be simplified so that impulses are always blanked or always canceled. It is also possible to combine blanking with canceling using decision feedback (DFB canceling). For very strong impulses, some benefit can be achieved by first blanking the signal and then performing DFB canceling. When the impulse is blanked, so is the Xmit signal. This introduces an interference similar to an impulse having instantaneous power identical to Xmit signal power. If the impulse power is significantly higher than the Xmit signal, then blanking it would reduce the burden on the Decision Feedback impulse canceler. Because Decision Feed Back canceling uses a prediction based on earlier tones to clean the current tone, it is limited by the impulse process innovation from earlier tones to the current tone. If the innovation is too large, slicer errors will occur. Blanking, by reducing this innovation for large impulses, extends the impulse canceler operating range.

Referring back to FIGS. 1 and 2, and according to another aspect of the invention, two output demodulation paths are used—a corrected path which passes through the impulse corrector 18, and an uncorrected path which preserves the original input signal. This dual-path structure can compensate for false alarms and timing errors generated by the impulse correction module 18 and is used to alleviate the conventional tradeoff between increasing probability of detection and increasing false alarms. For example, to reduce false alarms in the above described impulse detection system, the group size $T_G$ and/or the $TH_{GS}$ and $TH_{MW}$ should be increased. However when $T_G$, $TH_{GS}$, or $TH_{MW}$ are increased, the detection rate is reduced. Thus, it is advantageous to permit the impulse detection to generate false alarms and to correct them later.

In this architecture, the corrected and the uncorrected signal paths are input to reliability estimator and selector 20. Selector 20 selects the best signal among these two. As will be appreciated by one of skill in the art, by using the double path architecture, even when a false alarm or timing error is present on the "corrected" path, the output to the decoder will be from the uncorrected data path and therefore there is no harm due to the false alarm. The strength of the two path architecture is based on the accuracy of the Reliability Estimators 94, 96 (FIG. 2) used in the estimator and selector module 20. Preferably, the reliability estimators 94, 96 are accurate enough to also generate reliable erasures which are subsequently used by the decoder.

The reliability estimators 94, 96 operate by slicing the respective input signal and comparing the input of the slicer to its output. The closer the input signal is to the interpreted output, the more likely the input signal is to be reliable. More specifically, each one of the NTones input tones is sliced, thus producing a vector of NTones Decisions. For tones where the Xmit signal is known, i.e., quiet tones (where the Xmit Signal is 0) and preamble tones (where the Xmit signal taken from a known preamble sequence), the known value is used in the slicer's decision vector. Then, the per tone Decision is subtracted from the per tone Slicer input to produce a difference vector. (If the various tones do not have the same margin vs. background noise, it is preferred to scale them according to their individual margins.) Then, the sum of squares of the difference vector is computed to produce the reliability metric. The reliability metric has units of energy, wherein the higher the metric the less reliable the data.

Path Selection module 98 uses the generated Reliability Metric for two purposes. First the reliability metrics for the corrected and uncorrected data are compared and the input having the lower metric (i.e., the more reliable) is selected. Then, preferably, the reliability of the selected path is compared to a threshold value, $TH_{ERA}$. If the reliability metric exceeds $TH_{ERA}$, then even the most reliable path is deemed too unreliable to use and the entire column is erased so that the decoder gets erasures instead of channel symbols for the column.

While dual architectures have been described, both for impulse detection (Gram Schmidt and Moving window detectors), and for impulse correction (corrected and uncorrected path). It is also possible to use only a single impulse detector and/or a single path architecture to reduce complexity (at the price of a possible reduction in performance).

In the impulse detection and correction techniques discussed above, it was assumed that the impulse/burst duration L is given. In cases where this duration is not known, the processes described herein may be repeated with each possible L. Because the computations for different impulse durations are highly overlapping, a great deal of complexity may be saved by combining certain elements and steps. For example, the whitener and whitener match filter need not be duplicated because the same processing is performed for all durations. The suppression and merge with other bands can also be combined for all durations.

It can also be appreciated that there may be cases were the impulses are weak enough such that it is possible to modulate on some tones with a reduced bit loading even without canceler/blanking (i.e., using a loading lower/worse than that obtained after impulse canceling). In this case we may modulate on these tones using low loading. These tones can be considered blank tones, as opposed to quiet tones, since they will be used by blanking/canceling. The rest of the tones (none of which are blank tones) will use the loading obtained after applying the impulse canceler/blanker. These tones can be considered pure data tones. In this embodiment, the reception process will first demodulate the blanker tones, slice them, and then subtract the slicer output from these tones. Assuming the slicing was successful, the subtraction turns the blanker tones into quiet tones that may be used with the impulse canceler/blanker. After applying impulse cancellation or blanking, the pure data tones are demodulated. The benefit to this embodiment is that it achieves the maximal loading possible for the pure data tones (i.e., the loading obtained after applying the impulse canceler/blanker) while not entirely sacrificing bandwidth to quiet tones.

Those of skill in the art will also recognize that the present invention is not tied to the particular communication scheme described, but instead may be used in addition to point-to-point communication schemes, with multipoint-to-point, point-to-multipoint, and multipoint-to-multipoint schemes. In addition to multitone modulation, the invention can also be used with single carrier, CDMA and other modulation schemes. In non-multitone schemes, the transmitter should be configured to notch a few bands for use by the canceler/blanker as the quiet tones. Standard mechanisms can be used in the transmitter/receiver to correct for these notches.

This invention can be used in non-communication cases as well. For example, any signal that is corrupted with impulses and has one or more quiet sub bands may be cleaned using the above techniques by considering the quiet sub bands as quiet tones.

Yet another set of applications for this invention is to cancel low dimension noise contained in at most a few dimensions (i.e., noise exists in a low dimension linear subspace) from a high dimension signal where a few signal dimensions may be sacrificed to locate noise. A low dimensionality noise is a random signal which is a linear combination of a small number N of deterministic waveforms or basis functions. The waveforms are generally fixed and the particular coefficients for the linear combination are randomly distributed scalar variables. For this type of noise, most of the signal energy is contained in this low dimensional space. In other words, a large portion of the noise energy is contained within a small number of basis functions. For example in the impulse case, most signal energy is contained in a few successive (in discrete time) delta functions. In the ingress (narrow band noise) most signal energy is contained in a few neighboring frequencies. In contrast, white noise is not a low dimensionality noise because it has the same dimension as the useful signal. Given M samples of a target signal which is contaminated by white noise, the dimension N of the white noise component is also M. Further, the white noise power is evenly split among all of its N=M dimensions and, therefore, the present invention is not well suited for detecting and canceling this type of high-dimensionality noise.

Low dimensionality noise can be detected and canceled by projecting the noise on an orthogonal basis in a manner similar to the treatment of an impulse, discussed above. An example is a single carrier modulation corrupted by fast popping narrow ingresses wherein the frequency of the ingress is not known in advance and this frequency may change from time to time. In such a case, a quiet symbol is transmitted periodically (with the period getting longer as the ingress becomes narrower). The quiet symbol acts as a quiet tone for use in the detection/cancellation process. The ingress is highly correlated between successive symbols similar to impulse correlation between successive tones for an impulse canceler. By using the above techniques but swapping the frequency and time axes, the ingress frequency and an estimate of its waveform can be determined. It will be appreciated that the ingress frequency in this embodiment is the same as the impulse timing for the impulse canceler.

The dimension N of the matrices used in the noise detection and cancellation scheme of the invention is determined by the dimensionality N of the noise signal. Thus, the computational complexity of this method increases directly with the noise dimension. Furthermore, when the noise is detected through the use of quiet samples, such as the quiet tones used for impulse detection, the number of quiet samples used is preferably at least N. Thus, the larger the dimensionality of the noise, the more of the available bandwidth which must be reserved to carry quiet samples instead of a data signal. In general, noise having a dimensionality of no more than about three to five is well suited for detection and cancellation in accordance with the present invention, although use with higher dimensionality noise signals may be suitable in certain circumstances, such as when it is acceptable to cancel only a portion of a detected noise signal.

While the invention has been particularly shown and described with reference to preferred embodiments thereof, it will be understood by those skilled in the art that various other changes in form and details may be made therein without departing from the spirit and scope of the invention. For example, the present invention can be implemented using time-domain techniques or frequency-domain techniques.

Appendix A: Gram Schmidt Derivation

VCMT

This section presents the derivation of the impulse timing estimation for VCMT.

We model the input to impulse blanker/canceler (input to Noise whitener filter 30) as a combination of impulse noise and background noise. The impulse noise is modeled as the gating on and off (for the impulse duration) of a white noise source. A simplified discrete version of this model is $$\sum_{k=0}^{L-1} a_k \delta(n-k)$$

alternately (and more accurately) the impulse may be continuously modeled using a Fourier series. At this point we are not assuming any distribution on $a_k$, as it is difficult even to characterize the impulse noise power. We simply treat the $a_k$'s as free numbers. In appendix C we will give an alternate derivation assuming the $a_k$'s are Gaussian with known power. The background noise is modeled as a stationary colored Gaussian noise composed of Xmit signal and other noise sources.

Noise whitener filter 30 (FIG. 3) is used to whiten the background noise prior to impulse detection. Blocks after the whitener need to detect impulse existence using whitener output y(n).

To decide for a specific timing (t), whether that time was hit by an impulse (H1) or not (H0), we may use the log likelihood ratio below. According to Neyman-Pearson, to minimize False Alarm rate for a given Detection Rate, the LLR should be compared to a threshold $TH_{GS}$. In general H1 should be declared for LLR's above the threshold $TH_{GS}$ and H0 for LLR's below threshold $TH_{GS}$ (The higher the $TH_{GS}$ threshold the lower the False Alarm rate). Note that the LLR is maximized with respect to h, which is the impulse waveform (time domain), thus performing maximum likelihood for impulse coefficients.

$$LLR_{DETECT}(t) = \underset{h}{\text{Max}}\left\{\text{Ln}\left(\frac{p(y(t-s:t+s)/H_1)}{p(y(t-s:t+s)/H_0)}\right)\right\}$$

With, y, Signal input to whitener match filter
$H_1$, the hypothesis impulse with waveform h has hit at t
$H_0$, the hypothesis impulse has not hit at t
h, the impulse waveform (time domain)
s, the LLR "support", i.e., half the length of y on which LLR is computed However we cannot declare $H_1$ for all threshold exceeding $LLR_{DETECT}$'S. Typically since around the true timing of the impulse there would be a neighborhood of high $LLR_{DETECT}$'s, we would like to suppress the additional false detections. One intuitive way to suppress false detections is to look for local neighborhood maximas (i.e., mountain peaks). We will now give a detailed explanation showing this is at least approximately correct.

To choose among the two candidate times (t1 & t2) the more likely candidate we can use the $LLR_{TIME\_SELECT}$ below. Hypothesis $H_1$ stands for impulse has hit at t1, and hypothesis $H_2$ stands for impulse has hit at t2. If LLR is positive we will declare $H_2$ and if LLR is negative we will declare $H_1$. The vectors h1, h2 are the (probably different) impulse waveforms for $H_1$ and $H_2$. Note that the LLR is maximized over h1 & minimized over h2, thus performing maximum likelihood for impulse timing and coefficients.

$$LLR_{\text{TIME\_SELECT}}(t1, t2) = \underset{h1}{\text{MaxLn}}(p(y(t1-s:t1+s)/H_2)) - \underset{h2}{\text{MaxLn}}(p(y(t2-s:t2+s)/H_1))$$

With, y, Signal input to whitener match filter
$H_1$, the hypothesis impulse has hit at $t_1$
$H_2$, the hypothesis impulse has hit at $t_2$
$h_1$, the impulse waveform (time domain) for $H_1$
$h_2$, the impulse waveform (time domain) for $H_2$
s, the LLR "support", i.e., half the length of y on which LLR is computed Moreover $LLR_{TIME-SELECT}$ may be used to find the genuine impulse among a neighborhood of high $LLR_{DETECT}$. This may be accomplished by computing the $LLR_{TIME-SELECT}$ for each pair of times, and selecting the time $t_{opt}$ having positive $LLR_{TIME-SELECT}$ vs. all neighbors. Note we only have to suppress close neighbors, since as we depart in time from the impulse, the $LLR_{DETECT}$ drops and will not pass the detection threshold $TH_{GS}$.

Assuming the support (s) of y on which the LLR computation is performed, is big enough vs. neighborhood of false alarms (i.e., $t_1$–$t_2$), we have $$p(y(t1-s:t1+s)/H_0) \approx p(y(t2-s:t2+s)/H_0)$$

Since, as we will see below, each side of this (approximate) equality is a function of the L2 norm of its y segment, and the y segments in this case are almost entirely overlapping. Thus $$LLR_{TIME-SELECT}(t1,t2) \approx LLR_{DETECT}(t1) - LLR_{DETECT}(t2)$$

This (approximate) equality shows a time t having $LLR_{DETECT}$ higher than its neighbors would be preferred by $LLR_{TIME-SELECT}$ and selected as $t_{opt}$. Thus, instead of directly computing $LLR_{TIME\_SELECT}$ we may find local neighborhood maximas (mountain peaks) of $LLR_{DETECT}$ that exceed $TH_{GS}$.

The background noise is whitened by Noise Whitener 30, which outputs a σ power white Gaussian noise. However, the impulse is also affected by noise whitener 30. We have modeled an impulse of length L starting at time instant t, $$\sum_{k=0}^{L-1} a_k \delta(n-t-k),$$

thus after passing through whitener 30 we get a smeared impulse version $$h_n = \sum_{k=0}^{L-1} a_k f(n-t-k).$$

Using all these we get:

$$LLR_{DETECT}(t) = \underset{h}{\text{MaxLn}}\left(\frac{C \cdot \exp\left(-\frac{1}{2} \cdot \sum |(y_n - h_n)/\sigma|^2\right)}{C \cdot \exp\left(-\frac{1}{2} \cdot \Sigma |y_n/\sigma|^2\right)}\right)$$

$$= \underset{h}{\text{Max}} C' \cdot \left(\sum |y_n|^2 - \sum |y_n - h_n|^2\right)$$

Obviously $h_{opt}$ (i.e., the h that maximizes the LLR) cannot change the first term (in the last formula), it can only reduce the second term to maximize the LLR. Thus, $h_{opt}$ needs to get as close to $\{y_n\}$ as possible. Assuming $a_k$ are free numbers we get that $h_{opt}$ is the projection of $\{y_n\}$ on the subspace spanned by $$\sum_{k=0}^{L-1} a_k f(n-k),$$

It is known from linear algebra that the projection of $\{y_n\}$ on a subspace is the best "approximation" existing in the subspace to $\{y_n\}$. Thus, assuming $a_k^{opt}$ are the coefficients of $h_{opt}$, we would like to compute the following score for time t (Impulse time would be selected as the time having highest score)

$$\text{Score}(t) = \|y\|^2 - \|y - \sum a_k^{opt} f(n-k)\|^2$$

Since $h_{opt}$ is a projection of y, it is known that y equals the following orthogonal sum (i.e., sum of orthogonal vectors)

$$y = \left(\sum a_k^{opt} f(n-k)\right) \oplus \left(y - \sum a_k^{opt} f(n-k)\right)$$

As a result we have (Pitagoras over L2 vector space)

$$\|y\|^2 = \left\|\sum a_k^{opt} f(n-k)\right\|^2 + \left\|y - \sum a_k^{opt} f(n-k)\right\|^2$$

Thus $$\text{Score}(t) = \left\|\sum a_k^{opt} f(n-k)\right\|^2 = \|h_{opt}\|^2$$

So we need to compute the norm $\|h_{opt}\|^2$ of the projection of $\{y_n\}$ on the subspace spanned by $$\sum_{k=0}^{L-1} a_k f(n-k).$$

But to reduce complexity we do not want to compute $h_{opt}$ directly. This can be performed using a L*L matrix A that orthogonalizes the following basis $$B = \left\{ V_K \mid V_K = \begin{pmatrix} 0 \\ \vdots \\ 0 \end{pmatrix} \begin{matrix} K-1 \\ \\ \end{matrix} \quad 2^*s+L, \text{ for } k = 0 \ldots L-1 \right\}$$

i.e., $(FA)'(FA)=I$ with F as the following (2*s+L)*L matrix $F=[V_0 V_1 \ldots V_{L-1}]$ and with L, The modeled impulse duration.

Then applying Parsaval's theorem, the norm $\|h_{opt}\|^2$ is equal to the sum of squares of projections of $h_{opt}$ on any orthonormal basis (which $h_{opt}$ is a member of its span), since FA columns constitute such a basis we have:

$\text{Score}=\|h_{opt}\|^2=\|(FA)'y\|^2=\|A'(F'y)\|^2$

Such a triangular matrix A may be computed using Cholesky factorization on F'F. Note that A is the matrix resulting from the Gram Schmidt process on the basis $B=\{V_0 \ldots V_{L-1}\}$.

However (F'y) are L consecutive samples of the whitener match filter output 32 (FIG. 3). So we only need to additionally apply A' and than square and sum up. The grouping into L sample size groups is performed by FIFO 40, the multiplication by A' is performed by Gram Schmidt module 42 and energy summation is performed by energy summation module 44. Local neighborhood maxima is found by Group Divider 46 and Local Maxima detector 48. And finally comparison to threshold $TH_{GS}$ is performed by Threshold Local Maxima module 50. Note the fact A is triangular reduces matrix application (multiplication) complexity further.

The description above does not refer directly to matrix A, instead it refers to matrix $M_{GS}$=A', which is applied by Gram Schmidt module 42 in FIG. 3. The following are the steps for computing $M_{GS}$. Although the matrix $M_{GS}$ is applied (matrix multiplication) for each t, it need not be recomputed (Cholesky factorization) for each t. Matrix $M_{GS}$ depends only on $G_K$ and L that change when channel characteristics change (background noise or Impulse duration) and thus change slowly. Thus, the matrix $M_{GS}$ may be computed periodically by a low rate process.

This periodic Gram Schmidt matrix computation task is comprised of the following steps: The system assesses its input noise spectrum, including both stationary noise sources and the Xmit signal itself. Using the measured noise spectrum, it adapts the coefficients $G_K$ so that the whitener filter 30, having impulse response f(n), will whiten the input noise spectrum. Then using f(n) we build the matrix $F=[V_0 V_1 \ldots V_{L-1}]$ with $V_K$ defined above (definition of basis B). Then using, for example, Cholesky factorization, we find $M_{GS}$ such that $M_{GS}F'FM_{GS}'=I$ (since $M_{GS}F'FM_{GS}'=(FM_{GS}')'(FM_{GS}')=I$). Note that the whitener filter f(n) and the whitener match filter f*(−n) and matrixes $M_{GS}$ and $M_{LS}$ should be updated at the same time.

DMT

In this section we will derive impulse timing estimation for DMT. We are using the same impulse and background noise modeling as for VCMT.

Noise whitener 30 (FIG. 3) is used to whiten the background noise prior to impulse detection. For the case of DMT, the noise whitener can not be a linear time invariant filter (as for VCMT) since the LTI filter will smear the DMT. Instead we can use the output of the DFT (Discrete Fourier Transform) used for DMT signal demodulation, followed by a frequency equalizer (i.e., appropriate gain $G_K$ per tone). The DFT demodulates the Xmit signal and splits the background noise into orthogonal (uncorrelated) components. The frequency equalizer attenuates tones carrying stronger Xmit signal or background noise (both appearing to be noise for blanker/canceler). Thus, the final whitener output Y(K) is in frequency (tone) domain.

The blocks after the whitener need to detect impulse existence using whitener output Y(K). As before, the log likelihood ratio $LLR_{DETECT}$ is used for detecting impulses. The LLR is maximized with respect to H(K), which is the impulse waveform (in the frequency domain), thus performing maximum likelihood estimation for impulse coefficients. The support s parameter is not needed, since for DMT the LLR is based exactly on one DMT symbol length.

$$LLR_{DETECT}(t) = \text{Max}_H \left\{ \text{Ln}\left(\frac{p(Y/H_1(t))}{p(Y/H_0)}\right) \right\}$$

With, Y(K) Signal input to whitener match filter in frequency domain $H_1$, the hypothesis impulse with waveform H(K) has hit at t $H_0$, the hypothesis impulse has not hit at t H(K), the impulse waveform (in frequency domain)

However we cannot declare $H_1$ for all thresholds exceeding $LLR_{DETECT}$'s. Typically, since around the true timing of the impulse there would be a neighborhood of high LLR$_{DETECT}$'s, we would like to suppress the additional false detections. As with the VCMT case we would like to suppress false alarms by looking for local neighborhood maximas (i.e., mountain peaks). The explanation is similar to the VCMT case. Here the following equality holds exactly:

$$LLR_{TIME\_SELECT}(t1,t2)=LLR_{DETECT}(t1)-LLR_{DETECT}(t2)$$

since the support of hypothesis H$_1$ and H$_2$ is identical. This shows that by maximizing LLR$_{DETECT}$ we find a time t$_{opt}$ that is also selected by LLR$_{TIME\_SELECT}$.

The background noise is whitened by Noise Whitener 30, which outputs σ power white Gaussian noise. However, the impulse is also affected by noise whitener 30. We have modeled the impulse as $$\sum_{k=0}^{L-1} a_k \delta(n-t-k),$$

thus after passing through whitener 30 we get a scaled impulse version which has also been operated on by the DFT.

$$H(K,t) = G_K \sum_{n=0}^{L-1} a_n \exp\left(-\frac{j2\pi}{N}K(n+t)\right).$$

With N, number of DMT tones also equal to NFFT (size of FFT)
K, being the tone number, 0<=K<N
G$_K$, being tone K frequency noise equalizer gain
t, the sample index, within a DMT symbol (0<=t<NFFT), that the impulse started
L, being the modeled impulse length
a$_n$, being the impulse coefficients prior to DFT
Using all these we obtain:

$$LLR_{DETECT}(t) = \underset{H}{\text{MaxLn}}\left(\frac{C\cdot\exp\left(-\frac{1}{2}\cdot\sum_{K=0}^{NFFT-1}|(Y(K)-H(K,t))/\sigma|^2\right)}{C\cdot\exp\left(-\frac{1}{2}\cdot\sum_{K=0}^{NFFT-1}|Y(K)/\sigma|^2\right)}\right)$$

$$= \underset{H}{\text{Max}}C'\cdot\left(\sum_{K=0}^{NFFT-1}|Y(K)|^2 - \sum_{K=0}^{NFFT-1}|Y(K)-H(K)|^2\right)$$

As with the VCMT case, H$_{opt}$(K) (i.e., the H(K) that maximizes the LLR) needs to get as close to Y(K) as possible. Assuming a$_n$ are free numbers we get that H$_{opt}$ is the projection of {Y(K)} on the subspace spanned by basis B$_t$ below. As it is known from linear algebra that the projection of {Y(K)} on a subspace is the best "approximation" existing in the subspace to {Y(K)}, this yields:

$$B_t = \left\{V_n \mid V_n = \begin{pmatrix} G_0\cdot\exp\left(-\frac{j2\pi\cdot n}{N}\cdot 0\right) \\ \vdots \\ G_K\cdot\exp\left(-\frac{j2\pi\cdot n}{N}\cdot K\right) \\ \vdots \\ G_{NFFT-1}\cdot\exp\left(-\frac{j2\pi\cdot n}{N}\cdot(NFFT-1)\right) \end{pmatrix}, \text{for } n=t\ldots t+L-1\right\}$$

With NFFT, size of FFT, Also equal to NTones (Number of DMT tones)
t, The sample index, within a DMT symbol (0<=t<NFFT), that the impulse started
t+L−1, Impulse stop time
G$_K$, being tone K frequency noise equalizer gain Note for each t we get a difference subspace span(B$_t$). We would like to compute the following score for time t (Impulse time would be selected as the time having highest score)

$$\text{Score}(t)=\|Y\|^2-\|Y-H_{opt}(\cdot,t)\|^2$$

Since H$_{opt}$ is a projection of Y, it is known that Y equals the following orthogonal sum (i.e., sum of orthogonal elements)

$$y=(H_{opt})\oplus(y-H_{opt})$$

As a result we have (Pitagoras over L2 vector space)

$$\|Y\|^2=\|H_{opt}\|^2+\|Y-H_{opt}\|^2$$

Thus $$\text{Score}(t)=\|H_{opt}\|^2$$

So we need to compute the norm $\|H_{opt}(\cdot,t)\|^2$ of the projection of {Y(K)} on the subspace spanned by B$_t$. But to reduce complexity we do not want to compute H$_{opt}$ directly. This can be done using a matrix A$_t$ that orthogonalizes the matrix F$_t$ below, i.e., (F$_t$A$_t$)'(F$_t$A$_t$)=I, with NFFT*L matrix F$_t$ being composed of the basis vectors from B$_t$ as column vectors, i.e.:

$$F_t = [V_t V_{t+1} \cdots V_{t+L-1}]$$

With $t$,   Impulse start time
$t+L-1$,   Impulse stop time
$G_K$,   being tone $K$ frequency equalizer gain As with the VCMT case, applying Parsaval's theorem we get:

$$\text{Score}(t) = \|H_{opt}\|^2 = \|(F_tA_t)'Y\|^2 = \|A_t'(F_t'Y)\|^2$$

Such a triangular matrix A$_t$ may by computed using Cholesky factorization on F$_t$'F$_t$. Note that A$_t$ is the matrix resulting from the Gram Schmidt process on the basis B$_t$={V$_0$ ... V$_{L-1}$}.

The multiplication (F'Y) may be implemented efficiently using IFFT. Computation for all ranges t . . . t+L−1 (0<= t<NFFT) within a DMT symbol may be performed all at once. First we need to compute the vector W such that W(K)=Y(K)G$_K$ (note no complex conjugate is needed for G$_K$ since it is real) and then compute U=NFFT*IFFT(W). As a result U(t . . . t+L−1) corresponds to ((F$_t$)'Y).

To summarize the processing performed for each Hypothesis test at time t: the whitener 30 (FIG. 3) needs to perform FFT on its input and multiply each tone K by $G_K$. The whitener output Y(K) goes to whitener match filter 32 that again multiplies each tone K by $G_K$ and performs IFFT (the two multiplications may be combined into one multiplication by $GK_K^2$). Then FIFO 40 groups the whitener match filter output into L length overlapping groups. Multiplication by $A_t'$ is performed by Gram Schmidt module 42 and energy summation by Energy Summation module 44. Local neighborhood maxima is found by Group Divider 46 and Local Maxima detector 48. And finally comparison to threshold $TH_{GS}$ is performed by Threshold Local Maxima module 50. Note, the fact that $A_t$ is triangular also reduces the multiplication complexity.

The previous description does not refer directly to matrix $A_t$, instead it refers to matrix $M_{GS\_t}=A_t'$, which is applied by Gram Schmidt module 42 in FIG. 3. We will now point out the steps for computing $M_{GS}$. As in the VCMT case, the matrices $A_t$ may be computed periodically by a low rate process.

This periodic Gram Schmidt matrix computation task is comprised of the following steps: The system assesses its input noise spectrum, including both stationary noise sources and the Xmit signal itself. Using the measured noise spectrum, it adapts the coefficients $G_K$ so that the whitener filter 30, having impulse response f(n), will whiten the input noise spectrum. Then using $G_1, G_2, \ldots G_{NFFT-1}$ we build the matrixes $F_1, F_2, \ldots F_{NFFT-1}$, with $F_t=[V_t\, V_{t+1} \ldots V_{t+L-1}]$ and $V_K$ defined above (definition of basis $B_t$). Subsequently, we need to find for each t a matrix $M_{GS\_t}$ such that $M_{GS\_t}F_t'F_tM_{GS\_t}'=I$. This can be performed using Cholesky factorization. Note that the whitener and whitener match filter $G_K$'s and matrixes $M_{GS}$ and $M_{LS}$ should be updated at the same time.

Appendix B: Impulse Least Square Estimation

The impulse waveform least square estimation is used for the linear canceling (as opposed to decision feed back canceling). It uses primarily the quiet tones in order to determine the impulse coefficients. It is similar to an over determined solution of set of equations (Generalized Least Square solution). The derivation is straightforward and may be applied to VCMT and DMT as well. Here we explain the VCMT case.

Given the output of whitener 30 (FIG. 3) is y, and the whitener 30 filter shape is f(n), and the whitened noise power is σ, we would like to find impulse (smeared by f(n)) waveform $h_n$ such that the following log likelihood is maximized:

$$LL = \underset{h}{\text{MaxLn}}\left(C \cdot \exp\left(-\frac{1}{2} \cdot \sum |(y_n - h_n)/\sigma|^2\right)\right)$$

$$= \underset{h}{\text{Max}} C' \cdot \left(\sum |y_n - h_n|^2\right)$$

Assuming $a_k$, the impulse coefficients before whitener 30, are free numbers we get that $h_n$ is $$h_n = \sum_{k=0}^{L-1} a_k f(n-k)$$

Inserting this equation into the Log Likelihood we can obtain the $a_k$ using $$\arg\underset{a_K}{\min}\left\| y - \sum_1^L a_k f(n-k) \right\|$$

Using the "Orthogonality Principle", the error of optimal solution, projected on space spanned by $\sum a_k f(n-k)$, is zero we have:

$\left\| F'\left(y - \sum a_k f(n-k)\right) \right\| = 0$ with F the following (2*s+L)*L matrix (for the VCMT case)

$F=[V_0 V_1 \ldots V_{L-1}]$

L, The modeled impulse duration $V_K$, Defined as B in Appendix A the VCMT case (similar derivation is possible for the DMT case)

Thus we obtain:

$\Rightarrow F'y - F'Fa = 0$ $\Rightarrow a = (F'F)^{-1}F'y$

Note that F'y is already available at the output of whitener match filter 32 (FIG. 3). It was already grouped by FIFO 40 and used for impulse timing computation by Gram Schmidt module 42. Now we can reuse the output of FIFO 40 for impulse waveform estimation. We only need to multiply the output of FIFO 40 by matrix $(F'F)^{-1}$, a L*L matrix, with the product being the impulse waveform estimation. Also note we only need to perform this multiplication on the timing estimated by Gram Schmidt module 42. Thus, matrix multiplication is performed at a low rate and has a small effect on complexity. Furthermore, the computation of $(F'F)^{-1}$ needs to be performed at a very low rate. Since F is dependent only on channel characteristics (Background noise and Impulse duration).

The above description refers to impulse estimation matrix $M_{LS}$ which should be computed as follows: The system assesses its input noise spectrum, including both stationary noise sources and the Xmit signal itself. Using the measured noise spectrum, it adapts the coefficients $G_K$ so that the whitener filter 30, having impulse response f(n), will whiten the input noise spectrum. Then, using f(n) we construct matrix $F=[V_0\, V_1\, \ldots\, V_{L-1}]$ with $V_K$ as defined for basis B in Appendix A, i.e., the VCMT case. Finally we use F to compute $M_{LS}=(F'F)^{-1}$.

Appendix C: Using Apriori Impulse Power Knowledge

In this section we will derive impulse timing estimation for VCMT assuming we have an apriori knowledge of impulse power.

We model the input to impulse blanker/canceler (input to Noise whitener filter 30) as a combination of impulse noise and background noise. The impulse noise is modeled as the gating on and off (for the impulse duration) of a white Gaussian noise source. A simplified discrete version of this model is $$\sum_{k=0}^{L-1} a_k \delta(n-k),$$

alternately (and more accurately) we could have modeled the impulse continuously using a Fourier series. Thus, $a_k$ are assumed Gaussian with power $\sigma_I$. The background noise is modeled as a stationary colored Gaussian noise composed of Xmit signal and other noise sources.

Noise whitener 30 (FIG. 3) is used to whiten the background noise prior to impulse detection. Blocks after the whitener need to detect impulse existence using whitener output $y(n)$. As before the log likelihood ratio $LLR_{DETECT}$ is used for detecting impulses. The LLR is maximized with respect to $h(n)$, which is the impulse waveform (in the time domain), thus performing maximum likelihood estimation for impulse coefficients.

$$LLR_{DETECT}(t) = \max_h \left\{ \operatorname{Ln}\left( \frac{p(y(t-s:t+s)/H_1)}{p(y(t-s:t+s)/H_0)} \right) \right\}$$

With, y, Signal input to whitener match filter $H_1$, the hypothesis impulse has hit at t $H_0$, the hypothesis impulse has not hit at t h, the impulse waveform (time domain)

s, the LLR "support", i.e., half the length of y on which LLR is computed

However, we cannot declare $H_1$ for all thresholds exceeding $LLR_{DETECT}$'s. Typically, since around the true timing of the impulse there would be a neighborhood of high $LLR_{DETECT}$'S, we would like to suppress the additional false detections. As with previous cases, we can suppress false alarms by looking for local neighborhood maximas (i.e., mountain peaks) of $LLR_{DETECT}$'S.

The background noise is whitened by Noise Whitener 30, which outputs a $\sigma$ power white Gaussian noise. However, the impulse is also affected by noise whitener 30. We have modeled the impulse as $$\sum_{k=0}^{L-1} a_k \delta(n-k),$$

with $a_k$ being gaussian with power $\sigma_I^2$. Thus, after passing through whitener 30 we get a smeared impulse version $$h_n = \sum_{k=0}^{L-1} a_k f(n-k).$$

Using all these we obtain:

$$LLR_{DETECT}(t) = \max_h \operatorname{Ln}\left( \frac{C \cdot \exp\left(-\frac{1}{2} \cdot \sum |(y_n - h_n)/\sigma|^2 - \frac{1}{2} \cdot \sum |a_k/\sigma_I|^2\right)}{C \cdot \exp\left(-\frac{1}{2} \cdot \sum |y_n/\sigma|^2\right)} \right)$$

$$= \max_h C' \cdot \left( \sum |y_n|^2 - \sum |y_n - h_n|^2 - \sum |a_k \cdot \sigma/\sigma_I|^2 \right)$$

To efficiently calculate this maximization we use the following approach: In previous derivations we were working in a linear vector space of dimension N=dim(y) (i.e., having the same dimension as y), here we would like to expand this space so it additionally contains the $a_k$'s as its coordinates. This enables the formulation of the maximization above in terms of vector projection in the expanded linear space.

To re-formulate the maximization we first have to define vectors $\{V_K\}_{K=1 \ldots L}$. Vector $V_K$ is a column vector composed of two parts. The upper part has dimension N and the lower part has dimension L. The upper part is constructed by shifting $f(n)$ down K locations and padding with zeroes. The lower part is constructed by putting $\sigma/\sigma_I$ in location K and zero in all other L-1 locations. The following is an illustration of $V_K$.

$$V_K = \begin{pmatrix} \begin{pmatrix} 0 \\ \cdots \\ 0 \end{pmatrix} \} K-1 \\ f(n) \\ \cdots \\ \begin{pmatrix} 0 \\ \cdots \\ 0 \end{pmatrix} \} K-1 \\ \sigma/\sigma_I \\ 0 \\ \cdots \end{pmatrix} \begin{matrix} \} N \\ \\ \\ \} L \end{matrix}$$

In addition we need to append y with L zeros. Using the extended y and $V_K$ we can re-formulate the maximization:

$$\max_h C' \cdot \left( |y|^2 - \left| y - \sum_{K=1}^{L} a_K V_K \right|^2 \right) =$$

$$\max_h C' \cdot \left( \left| \begin{pmatrix} y_1 \\ \cdots \\ y_N \\ 0 \\ \cdots \\ 0 \end{pmatrix} \right|^2 - \left| \begin{pmatrix} y_1 \\ \cdots \\ y_N \\ 0 \\ \cdots \\ 0 \end{pmatrix} - \sum_{K=1}^{L} a_K \begin{pmatrix} 0 \\ \cdots \\ 0 \\ f(n) \\ \cdots \\ 0 \\ \cdots \\ 0 \\ \sigma/\sigma_I \\ 0 \\ \cdots \end{pmatrix} \right|^2 \right)$$

The re-formulated maximization is identical to the original one. The difference is that the $a_k$ related components are generated by the vector extensions. Using this vector formulation it is obvious we need to minimize the second addend. The second addend is simply the error of approximating y using $V_K$'S. Moreover it is known from linear algebra that the projection of y on a subspace spanned by $V_K$ is the best "approximation" existing in the subspace to y. Thus, to find the maxima we should project the extended y on the subspace spanned by $V_K$. This is identical to cases of impulse detection without apriori knowledge (appendix A) but in the extended space.

Continuing similarly to previous derivations we obtain Score(t)

$$Score(t) = \left\| \sum a_k^{opt} V_K \right\|^2.$$

So we need to compute the norm of the projection of y on the subspace spanned by $\{V_K\}$. This can be performed using a matrix 'A' that orthogonalizes the basis $\{V_K | k=1 \ldots L\}$ i.e.

$$(VA)'(VA)=I$$

with $V=[V_1 \; V_2 \; \ldots \; V_L]$
L, The modeled impulse duration in samples
Then $$Score(t) = \left\| \sum a_k^{opt} V_K \right\|^2 = \|(VA)'y\|^2 = \|A'(V'y)\|^2$$

Such a triangular matrix A may by computed using Cholesky factorization on V'V. The fact that A is triangular further reduces the complexity. Since y was extended with zeros it turns out that $$(V'y)=(F'y)$$

with $$F = [f_0 \, f_1 \ldots f_{L-1}]$$

$$f_k = \begin{pmatrix} \left. \begin{matrix} 0 \\ \cdots \\ 0 \end{matrix} \right\} K-1 \\ f(n) \\ \left. \begin{matrix} 0 \\ \cdots \\ 0 \end{matrix} \right\} L-K \end{pmatrix} \Bigg\} 2^*s+L$$

s, the support of f(n) (i.e., length of f(n) is 2*s+1)
L, The modeled impulse duration in samples However (F'y) are L consecutive samples of the whitener match filter output 32 (FIG. 3). So we only need to additionally apply A' and then square and sum up. Then we can continue as before (Appendix A). The only difference vs. appendix A is a different computation for matrix A, i.e., Cholesky factorization on V'V instead of F'F.

The description above does not refer directly to matrix A, instead it refers to matrix $M_{GS}$=A', which is applied by Gram Schmidt module 42 in FIG. 3. To summarize, the steps for computing $M_{GS}$ for this apriori impulse power case are as follows. As in the VCMT case, the matrix A may be computed periodically by a low rate process.

This periodic Gram Schmidt matrix computation task is comprised of the following steps: The system assesses its input noise spectrum, including both stationary noise sources and the Xmit signal itself. Using the measured noise spectrum, it adapts the coefficients $G_K$ so that the whitener filter 30, having impulse response f(n), will whiten the input noise spectrum. Then using f(n) we build the matrix F=[$V_0$ $V_1$ . . . $V_{L-1}$] with $V_K$ defined above. Then using, for example, Cholesky factorization, we find $M_{GS}$ such that $M_{GS}$F'F$M_{GS}$'=I (since $M_{GS}$F'F$M_{GS}$'=(F$M_{GS}$')'(F$M_{GS}$')=I). Note that the whitener filter f(n) and the whitener match filter f*(−n) and matrixes $M_{GS}$ and $M_{LS}$ should be updated at the same time.

What is claimed is:

1. A system for detecting and correcting non-stationary noise present on an input data signal comprising:
    a detector module based on Gram Schmidt orthogonalization, receiving the input data signal and producing as output a correction enable signal indicating when a correction is required;
    a corrector module receiving the input data signal and correction enable signal and producing a corrected data signal as output; and
    a reliability estimator and selector module receiving the corrected data signal and the input data signal and producing an output signal which is the more reliable of the input data signal and the corrected data signal.

2. The system of claim 1, wherein the reliability estimator and selector module comprises:
    a first reliability estimator receiving the corrected data signal and producing as output a first reliability estimate indicating the reliability of the corrected data signal;
    a second reliability estimator receiving the input data signal and producing as output a second reliability estimate indicating the reliability of the input data signal; and
    a comparison module receiving the first and second reliability estimates and selecting one of the corrected data signal and the input data signal as output depending on relative values of the first and second reliability estimates.

3. The system of claim 2, wherein the comparison module is configured to select a default output signal when the input data signal and the corrected data signal have reliabilities which are less than a predetermined reliability threshold.

4. The system of claim 3, wherein the default output signal comprises an erasure.

5. The system of claim 2, wherein:
    the first and second reliability estimators each comprise a slicer; and
    the first and second reliability estimates each comprise a reliability metric indicating a difference
    between the input to the respective slicer and the output from the respective slicer, wherein the lower the reliability metric, the more reliable the signal.

6. The system of claim 5, wherein the comparison module is configured to select a default output signal when the first and second reliability estimates each exceed a predetermined threshold.

7. The system of claim 1, wherein the non-stationary noise is an impulse noise and wherein the detector module includes an impulse detector module which comprises:
    a first impulse detector receiving the input data signal and producing a first impulse detection signal as output;
    a second impulse detector receiving the input data signal and producing a second impulse detection signal as output; and
    an impulse correction enable module receiving the first and second impulse detection signals and producing the correction enable signal in accordance with the first and second impulse detection signals.

8. The system of claim 1, wherein the non-stationary noise is an impulse noise and wherein the corrector module includes an impulse corrector module which comprises an impulse blanker module and an impulse canceler module, the blanker or canceler modules being selected in accordance with the correction enable signal produced by the impulse corrector module.

9. The system of claim 7, wherein the first and second impulse detectors are complementary.

10. The system of claim 9, wherein:
the first impulse detector comprises a Gram Schmidt impulse detector; and
the second impulse detector comprises a moving window threshold detector.

11. The system of claim 10, wherein the impulse corrector module comprises an impulse blanker module and an impulse canceler module, the blanker or canceler modules being selected in accordance with the correction enable signal produced by the impulse corrector module.

12. The system of claim 11, wherein the impulse correction enable module is configured to generate the correction enable signal to:
blank an impulse if an impulse is detected by the moving window threshold detector but not the Gram Schmidt impulse detector;
cancel an impulse if an impulse is detected using the Gram Schmidt impulse detector but not the moving window threshold detector;
cancel an impulse if an impulse is detected by the Gram Schmidt impulse detector at a first time of arrival, and an impulse is detected by the moving window threshold detector at a second time of arrival within a predetermined interval from the first time of arrival; and
blank an impulse if an impulse is detected by the Gram Schmidt impulse detector at a first time of arrival, and an impulse is detected by the moving window threshold detector at a second time of arrival which is not within a predetermined interval from the first time of arrival.

13. The system of claim 8, wherein the detector module generates an impulse location signal which is provided to the impulse canceler module which in turn generates as output a waveform estimate of a detected impulse which is used to cancel the detected impulse.

14. The system of claim 13, wherein the impulse canceler module comprises an iterative decision feedback impulse canceler.

15. The system of claim 13, wherein the impulse canceler module comprises a least square impulse canceler.

16. The system of claim 13, further comprising a merge module which receives the impulse location signal from the detector module and also receives at least one additional impulse location signal from an impulse detector associated with a neighboring band and which produces as output a combined estimated impulse timing.

17. The system of claim 1, wherein the non-stationary noise comprises low dimensionality noise contained in at most a few dimensions.

18. The system of claim 17, wherein the low dimensionality noise comprises fast popping ingresses.

19. The system of claim 1, wherein the data signal is carried on one of a single carrier modem, a multitone modem, and a CDMA modem.

20. A method for detecting and correcting non-stationary noise present on an input data signal comprising:
receiving the input data signal at a detector module based on Gram Schmidt orthogonalization which produces as output a correction enable signal indicating when a correction is required;
receiving the input data signal and correction enable signal at a corrector module which produces a corrected data signal as output; and
receiving the corrected data signal and the input data signal at a reliability estimator and selector module which produces an output signal which is the more reliable of the input data signal and the corrected data signal.

21. The method of claim 20, further comprising the following steps:
receiving the corrected data signal at a first reliability estimator which produces as output a first reliability estimate indicating the reliability of the corrected data signal;
receiving the input data signal at a second reliability estimator which produces as output a second reliability estimate indicating the reliability of the input data signal; and
comparing the first and second reliability estimates using a comparison module which selects one of the corrected data signal and the input data signal as output depending on relative values of the first and second reliability estimates.

22. The method of claim 21, wherein the comparison module performs the step of selecting a default output signal when the input data signal and the corrected data signal have reliabilities which are less than a predetermined reliability threshold.

23. The method of claim 22, wherein the default output signal comprises an erasure.

24. The method of claim 21, further comprising the following steps:
utilizing a slicer in each of the first and second reliability estimators; and
the first and second reliability estimates each comprising a reliability metric indicating a difference between the input to the respective slicer and the output from the respective slicer, wherein the lower the reliability metric, the more reliable the signal.

25. The method of claim 24, wherein the comparison module performs the step of selecting a default output signal when the first and second reliability estimates each exceed a predetermined threshold.

26. The method of claim 20, wherein the non-stationary noise is an impulse noise and wherein the detector module includes an impulse detector module, the method further comprising the following steps:
receiving the input data signal at a first impulse detector which produces a first impulse detection signal as output;
receiving the input data signal at a second impulse detector which produces a second impulse detection signal as output; and
receiving the first and second impulse detection signals at an impulse correction enable module which produces the correction enable signal in accordance with the first and second impulse detection signals.

27. The method of claim 20, wherein the non-stationary noise is an impulse noise and wherein the corrector module includes an impulse corrector module which comprises an impulse blanker module and an impulse canceler module, the method further comprising the step of selecting the blanker or canceler modules in accordance with the correction enable signal produced by the impulse corrector module.

28. The method of claim 26, wherein the first and second impulse detectors are complementary.

29. The method of claim 28, wherein:
the first impulse detector comprises a Gram Schmidt impulse detector; and
the second impulse detector comprises a moving window threshold detector.

30. The method of claim 29, wherein the impulse corrector module comprises an impulse blanker module and an impulse canceler module, the method further comprising the step of selecting one of the blanker or canceler modules in accordance with the correction enable signal produced by the impulse corrector module.

31. The method of claim 30, further comprising the step of utilizing the impulse correction enable module to generate the correction enable signal to:
- blank an impulse if an impulse is detected by the moving window threshold detector but not the Gram Schmidt impulse detector;
- cancel an impulse if an impulse is detected using the Gram Schmidt impulse detector but not the moving window threshold detector;
- cancel an impulse if an impulse is detected by the Gram Schmidt impulse detector at a first time of arrival, and an impulse is detected by the moving window threshold detector at a second time of arrival within a predetermined interval from the first time of arrival; and
- blank an impulse if an impulse is detected by the Gram Schmidt impulse detector at a first time of arrival, and an impulse is detected by the moving window threshold detector at a second time of arrival which is not within a predetermined interval from the first time of arrival.

32. The method of claim 27, wherein the detector module performs the step of generating an impulse location signal which is provided to the impulse canceler module which in turn generates as output a waveform estimate of a detected impulse which is used to cancel the detected impulse.

33. The method of claim 32, wherein the impulse canceler module comprises an iterative decision feedback impulse canceler.

34. The method of claim 32, wherein the impulse canceler module comprises a least square impulse canceler.

35. The method of claim 32, further comprising the step of receiving at a merge module the impulse location signal from the detector module and also receiving at least one additional impulse location signal from an impulse detector associated with a neighboring band and producing as output a combined estimated impulse timing.

36. The method of claim 20, wherein the non-stationary noise comprises low dimensionality noise contained in at most a few dimensions.

37. The method of claim 36, wherein the low dimensionality noise comprises fast popping ingresses.

38. The method of claim 20, wherein the data signal is carried on one of a single carrier modem, a multitone modem, and a CDMA modem.

* * * * *